(12) United States Patent
Ogawa

(10) Patent No.: US 12,459,742 B2
(45) Date of Patent: Nov. 4, 2025

(54) HANDLING SYSTEM, INSTRUCTION DEVICE, HANDLING METHOD, AND STORAGE MEDIUM

(71) Applicant: KABUSHIKI KAISHA TOSHIBA, Tokyo (JP)

(72) Inventor: Akihito Ogawa, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 739 days.

(21) Appl. No.: 17/808,761

(22) Filed: Jun. 24, 2022

(65) Prior Publication Data
US 2022/0411190 A1 Dec. 29, 2022

(30) Foreign Application Priority Data
Jun. 28, 2021 (JP) .................. 2021-106646

(51) Int. Cl.
*B65G 1/04* (2006.01)
*B25J 9/00* (2006.01)
(Continued)

(52) U.S. Cl.
CPC .......... *B65G 1/1378* (2013.01); *B25J 9/0093* (2013.01); *B65G 1/0421* (2013.01);
(Continued)

(58) Field of Classification Search
CPC .. B65G 1/1378; B65G 1/0421; B65G 1/0492; B65G 1/1373; B65G 2201/0235; B65G 2203/0241; B65G 1/065; B25J 9/0093; B25J 11/00; G05B 19/41895; G05B 2219/50363; G05B 2219/50362; G05B 2219/50391; G06Q 10/083
See application file for complete search history.

(56) References Cited

U.S. PATENT DOCUMENTS 5,568,393 A 10/1996 Ando et al.
10,395,152 B2 * 8/2019 Durham ............... B65G 1/1375
(Continued)

FOREIGN PATENT DOCUMENTS

CN 101234677 A 8/2008
CN 103596858 A 2/2014
(Continued)

OTHER PUBLICATIONS

Chinese Office Action dated Aug. 4, 2025, issued in Chinese Patent Application No. 202210746575.2 (with English translation; Documents 15-18 cited therein).

*Primary Examiner* — Thomas Randazzo
(74) *Attorney, Agent, or Firm* — Oblon, McClelland, Maier & Neustadt, L.L.P.

(57) ABSTRACT

According to one embodiment, a handling system includes a first mobile robot, a first transfer robot, and a picking robot. The first mobile robot transports a first container out of a loading location of the first container. An article is stored in the first container. The first transfer robot transfers the first container from one of the first mobile robot or a first loading platform to the other of the first mobile robot or the first loading platform. The picking robot moves the article from the first container placed on the first loading platform to a second container placed on a second loading platform.

16 Claims, 37 Drawing Sheets

(51) Int. Cl.
  *B65G 1/06*         (2006.01)
  *B65G 1/137*        (2006.01)
  *G05B 19/418*       (2006.01)

(52) U.S. Cl.
  CPC ........... *B65G 1/0492* (2013.01); *B65G 1/065* (2013.01); *B65G 1/1373* (2013.01); *G05B 19/41895* (2013.01); *B65G 2201/0235* (2013.01); *B65G 2203/0241* (2013.01); *G05B 2219/50363* (2013.01)

(56) References Cited

U.S. PATENT DOCUMENTS

| | | | |
|---|---|---|---|
| 2016/0101940 A1* | 4/2016 | Grinnell | G05D 1/0289 700/218 |
| 2016/0176638 A1* | 6/2016 | Toebes | G05D 1/0282 701/25 |
| 2018/0082162 A1 | 3/2018 | Durham et al. | |
| 2018/0265298 A1 | 9/2018 | Wagner et al. | |
| 2019/0034727 A1 | 1/2019 | Chihara et al. | |
| 2019/0240830 A1 | 8/2019 | Lim et al. | |
| 2020/0223066 A1 | 7/2020 | Diankov et al. | |
| 2021/0394364 A1* | 12/2021 | Ogawa | B25J 9/1664 |
| 2021/0395007 A1* | 12/2021 | Galluzzo | B65G 1/1371 |
| 2021/0395008 A1* | 12/2021 | Zheng | G05D 1/223 |
| 2022/0234831 A1 | 7/2022 | Szyszkowski et al. | |

FOREIGN PATENT DOCUMENTS

| | | |
|---|---|---|
| CN | 105593143 A | 5/2016 |
| CN | 108527322 A | 9/2018 |
| CN | 112371517 A | 2/2021 |
| EP | 3 520 969 A1 | 8/2019 |
| JP | 5-270611 | 10/1993 |
| JP | 2019-25566 A | 2/2019 |
| JP | 2020-104986 A | 7/2020 |
| JP | 6738112 B2 | 8/2020 |
| JP | 2022-1513 A | 1/2022 |
| WO | WO 2017/110509 A1 | 6/2017 |
| WO | WO 2021/010298 A1 | 1/2021 |

* cited by examiner

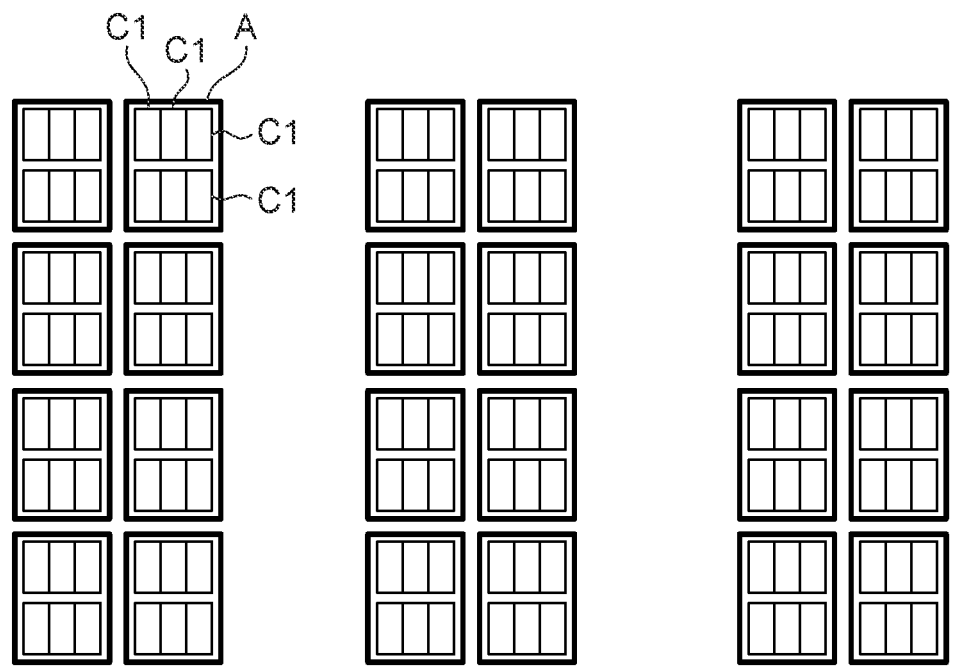
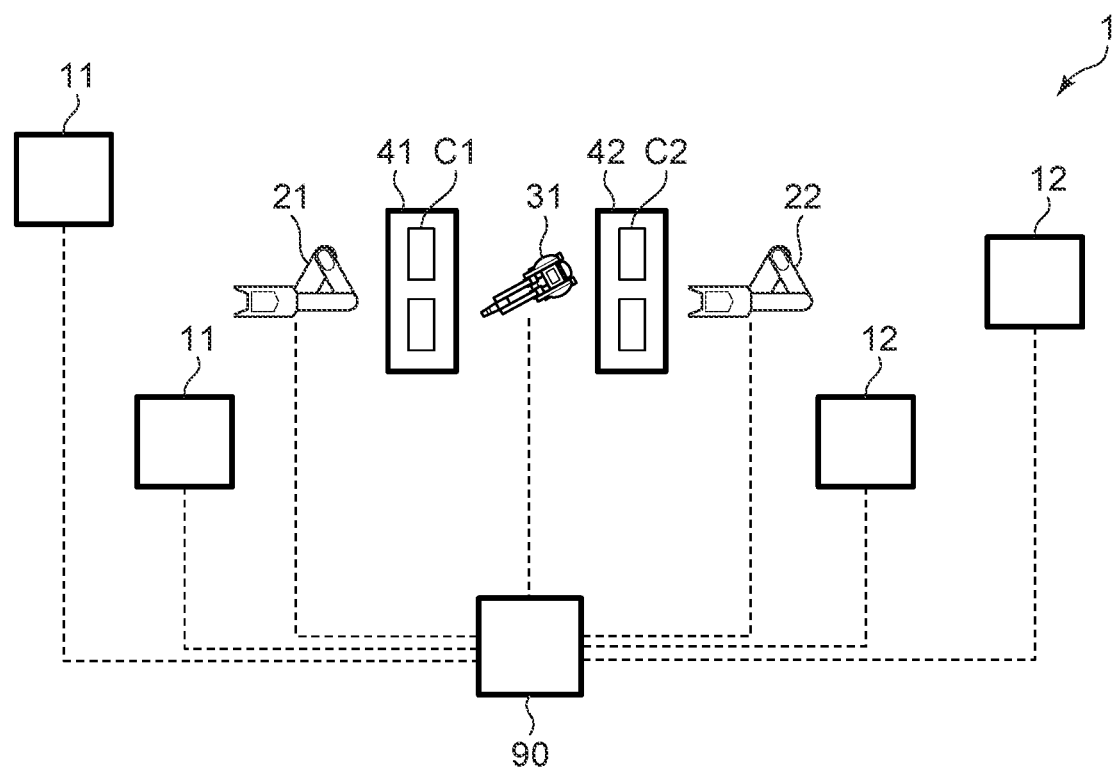
FIG. 1

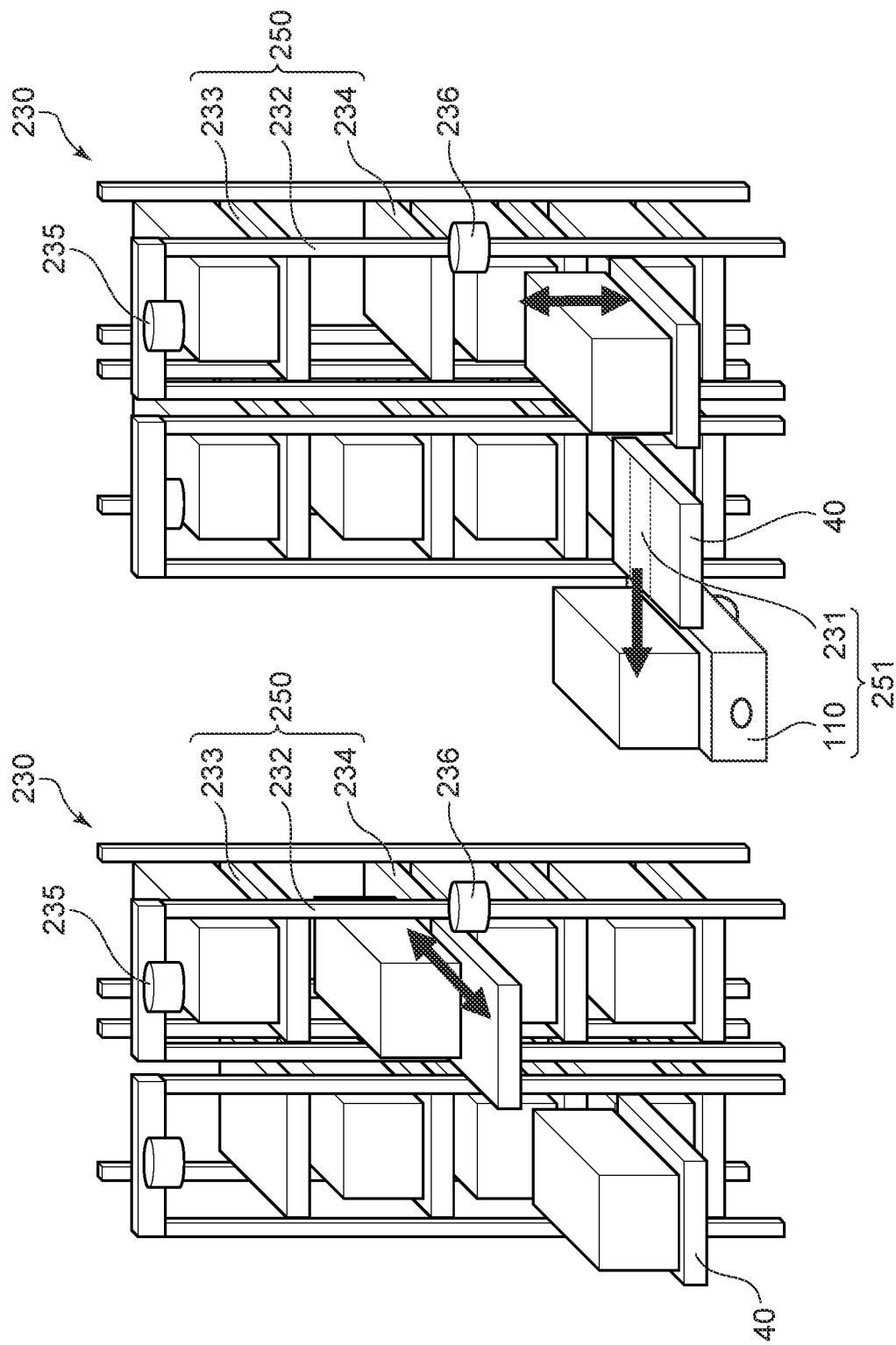

| ARTICLE ID | ARTICLE INFORMATION ||||| STORAGE MANAGEMENT INFORMATION |||||
| | ARTICLE NAME | WEIGHT [kg] | H SIZE [mm] | W SIZE [mm] | D SIZE [mm] | QUANTITY | SHELF ID | SUB-SHELF ID | CONTAINER ID | SUB-CONTAINER ID |
|---|---|---|---|---|---|---|---|---|---|---|
| MMMM001 | LAN CABLE 10M | 0.80 | 50 | 250 | 250 | 10 | AAA001 | 005 | BBB005 | 008 |
| MMMM002 | REPLACEMENT LED | 0.05 | 100 | 30 | 30 | 5 | AAA002 | 003 | BBB003 | 002 |
| MMMM002 | REPLACEMENT LED | 0.05 | 100 | 30 | 30 | 15 | AAA085 | 002 | BBB011 | 006 |
| MMMM003 | COLD PACK | 1.20 | 40 | 300 | 280 | 8 | AAA122 | 008 | BBB008 | 003 |
| MMMM004 | BEVERAGE 500ML | 0.50 | 300 | 55 | 55 | 6 | AAA016 | 009 | BBB009 | 010 |

FIG. 8

| LIST NUMBER | SHIPPING BOX NUMBER | | DESTINATION ID | ARTICLE NUMBER | QUANTITY | SHIPPING INFORMATION | APPURTENANT INFORMATION |
|---|---|---|---|---|---|---|---|
| | ORDER NUMBER | SUB-NUMBER | | | | | |
| 000001 | XXX001 | 01 | HJKUHH | YYYY080 | 1 | MAR06AM | |
| 000002 | XXX001 | 01 | HJKUHH | YYYY018 | 1 | MAR06AM | |
| 000003 | XXX001 | 01 | HJKUHH | YYYY100 | 1 | MAR06AM | |
| 000004 | XXX001 | 02 | HJKUHH | YYYY101 | 2 | MAR06AM | |
| 000005 | XXX001 | 02 | HJKUHH | YYYY023 | 3 | MAR06AM | |
| 000006 | XXX002 | 01 | DDEFG | YYYY005 | 1 | MAR06AM | fragile |
| 000007 | XXX002 | 01 | DDEFG | YYYY080 | 1 | MAR06AM | |
| 000008 | XXX003 | 01 | YUIOTR | YYYY080 | 1 | MAR06AM | |
| 000009 | XXX004 | 01 | YUIOTR | YYYY020 | 3 | MAR06PM | |
| 000010 | XXX004 | 01 | YUIOTR | YYYY034 | 1 | MAR06PM | |

FIG. 10

| ROBOT | OPERATION | 10 | 20 | 30 | 40 | 50 | 60 | 70 | 80 |
|---|---|---|---|---|---|---|---|---|---|
| FIRST TRANSFER ROBOT 21 | STANDBY | | | | | | | | |
| | TRANSFER TO 41a | | C1a | | | | | | |
| | 41a LOADED CONTAINER | | | C1a | C1a | C1c | C1c | C1c | C1c |
| | TRANSFER FROM 41a | | | | C1a | | | | |
| | TRANSFER TO 41b | | | C1b | | | | | |
| | 41b LOADED CONTAINER | | | | C1b | C1b | C1b | C1d | C1d |
| | TRANSFER FROM 41b | | | | | | | | |
| SECOND TRANSFER ROBOT 22 | STANDBY | | | | | | | | |
| | TRANSFER TO 42a | | C2a | | | | | | |
| | 42a LOADED CONTAINER | | | C2a | C2a | C2a | C2c | C2c | C2c |
| | TRANSFER FROM 42a | | | | | C2a | | | |
| | TRANSFER TO 42b | | | C2b | | | | | |
| | 42b LOADED CONTAINER | | | | C2b | C2b | C2b | C2b | C2d |
| | TRANSFER FROM 42b | | | | | | | | |
| PICKING ROBOT 31 | STANDBY | | | | | | | | |
| | PICKING | | | B1 | B2 | B2 | B3 | B3 | B4 |

FIG. 13

| ROBOT | OPERATION | TIME (SECONDS) | | | | | | | |
|---|---|---|---|---|---|---|---|---|---|
| | | 10 | 20 | 30 | 40 | 50 | 60 | 70 | 80 |
| FIRST TRANSFER ROBOT 21 | STANDBY | | | | | | | | |
| | TRANSFER TO 41a | | C1a | | | | | | C1d |
| | 41a LOADED CONTAINER | | | C1a | C1a | C1a | C1a | | |
| | TRANSFER FROM 41a | | | | | | | C1a | |
| | TRANSFER TO 41b | | | C1b | | | C1c | | |
| | 41b LOADED CONTAINER | | | | C1b | | | C1c | C1c |
| | TRANSFER FROM 41b | | | | | C1b | | | |
| SECOND TRANSFER ROBOT 22 | STANDBY | | | | | | | | |
| | TRANSFER TO 42a | | C2a | | | | | | |
| | 42a LOADED CONTAINER | | | C2a | C2a | C2a | C2c | C2c | C2c |
| | TRANSFER FROM 42a | | | | | | | | |
| | TRANSFER TO 42b | | | | C2b | | | | C2d |
| | 42b LOADED CONTAINER | | | | | C2b | C2b | | |
| | TRANSFER FROM 42b | | | | | | | C2b | |
| PICKING ROBOT 31 | STANDBY | | | | | | | | |
| | PICKING | | | B1 | B2 | B1 | B1 | B3 | B3 |

| ROBOT | OPERATION | 10 | 20 | 30 | 40 | 50 | 60 | 70 | 80 |
|---|---|---|---|---|---|---|---|---|---|
| FIRST TRANSFER ROBOT 21 | STANDBY | ▓ | | | | | | | |
| | TRANSFER TO 41a | | C1a | C1a | | | | | |
| | 41a LOADED CONTAINER | | | | | C1c | C1c | C1c | |
| | TRANSFER FROM 41a | | | | C1a | | | | C1c |
| | TRANSFER TO 41b | | | C1b | C1b | C1b | | | |
| | 41b LOADED CONTAINER | | | | | | C1b | | |
| | TRANSFER FROM 41b | | | | | | | C1d | C1d |
| SECOND TRANSFER ROBOT 22 | STANDBY | ▓ | | | | | | | |
| | TRANSFER TO 42a | | C2a | C2a | C2a | C2a | C2a | | |
| | 42a LOADED CONTAINER | | | | | | | C2a | |
| | TRANSFER FROM 42a | | | | | | C2c | C2c | C2c |
| | TRANSFER TO 42b | | | C2b | C2b | C2b | | | |
| | 42b LOADED CONTAINER | | | | | | | | |
| | TRANSFER FROM 42b | | | | | C2b | | | C2d |
| PICKING ROBOT 31 | STANDBY | ▓ | ▓ | | | | | | |
| | PICKING | | | B1 | B2 | B2 | B3 | B3 | B4 |

TIME (SECONDS)

FIG. 22

| ROBOT | OPERATION | TIME (SECONDS) | | | | | | | |
|---|---|---|---|---|---|---|---|---|---|
| | | 10 | 20 | 30 | 40 | 50 | 60 | 70 | 80 |
| FIRST TRANSFER ROBOT 21 | STANDBY | | | | | | | | |
| | TRANSFER TO 41a | | C1a | | | | | | |
| | 41a LOADED CONTAINER | | | C1a | | | C1c | C1c | |
| | TRANSFER FROM 41a | | | | C1a | C1c | | | C1c |
| | TRANSFER TO 41b | | | C1b | | | | C1d | C1d |
| | 41b LOADED CONTAINER | | | | C1b | C1b | | | |
| | TRANSFER FROM 41b | | | | | | C1b | | |
| SECOND TRANSFER ROBOT 22 | STANDBY | | | | | | | | |
| | REMOVE SHIPPING BOX | | C2a | | | | C2e | C2e | C2e |
| | LOAD SHIPPING BOX (42a) | | | C2a | C2c | C2c | | | |
| | FETCH SHIPPING BOX | | | | | | | | |
| | SHIPPING MECHANISM 51a | | | | C2a | | C2c | | |
| | REMOVE SHIPPING BOX | | | C2b | | C2d | | | C2f |
| | LOAD SHIPPING BOX (42b) | | | | C2b | | C2d | | |
| | FETCH SHIPPING BOX | | | | | C2b | | C2d | |
| | SHIPPING MECHANISM 51b | | | | | | | | |
| PICKING ROBOT 31 | STANDBY | | | | | | | | |
| | PICKING | | | B1 | B2 | B2 | B3 | B3 | B4 |

| ROBOT | OPERATION | 10 | 20 | 30 | 40 | 50 | 60 | 70 | 80 |
|---|---|---|---|---|---|---|---|---|---|
| FIRST TRANSFER ROBOT 21 | STANDBY | ▨ | | | | | | | |
| | TRANSFER TO 41a | | C1a | | | | | | |
| | 41a LOADED CONTAINER | | | C1a | C1a | | | | |
| | TRANSFER FROM 41a | | | | | C1c | C1c | C1c | C1c |
| | TRANSFER TO 41b | | | C1b | | | | | |
| | 41b LOADED CONTAINER | | | | C1b | C1b | C1b | | |
| | TRANSFER FROM 41b | | | | | | | C1d | C1d |
| SECOND TRANSFER ROBOT 22 | STANDBY | ▨ | | | | | | | |
| | TRANSFER TO 42a | | C2a | | | | | | |
| | 42a LOADED CONTAINER | | | C2a | C2a | | | | |
| | TRANSFER FROM 42a | | | | | C2c | C2c | C2c | C2c |
| | TRANSFER TO 42b | | | C2b | | | | | |
| | 42b LOADED CONTAINER | | | | C2b | C2b | C2b | | |
| | TRANSFER FROM 42b | | | | | | | C2b | C2d |
| PICKING ROBOT 31 | STANDBY | ▨ | ▨ | | | | | | |
| | PICKING | | | B1 | B2 | | B3 | | B4 |

TIME (SECONDS)

FIG. 23

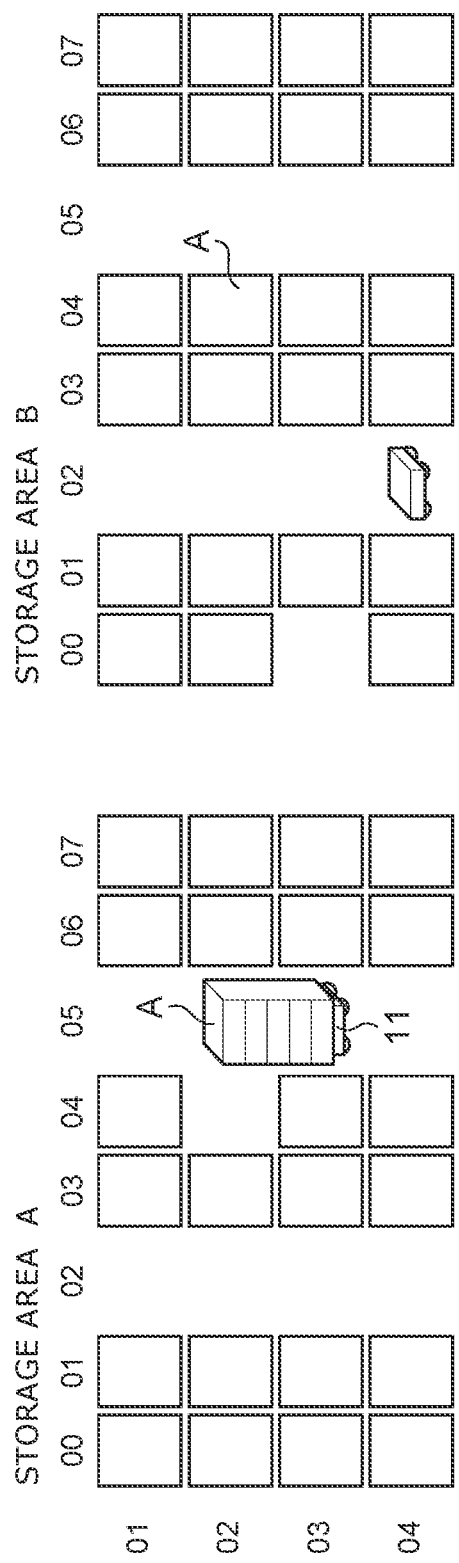
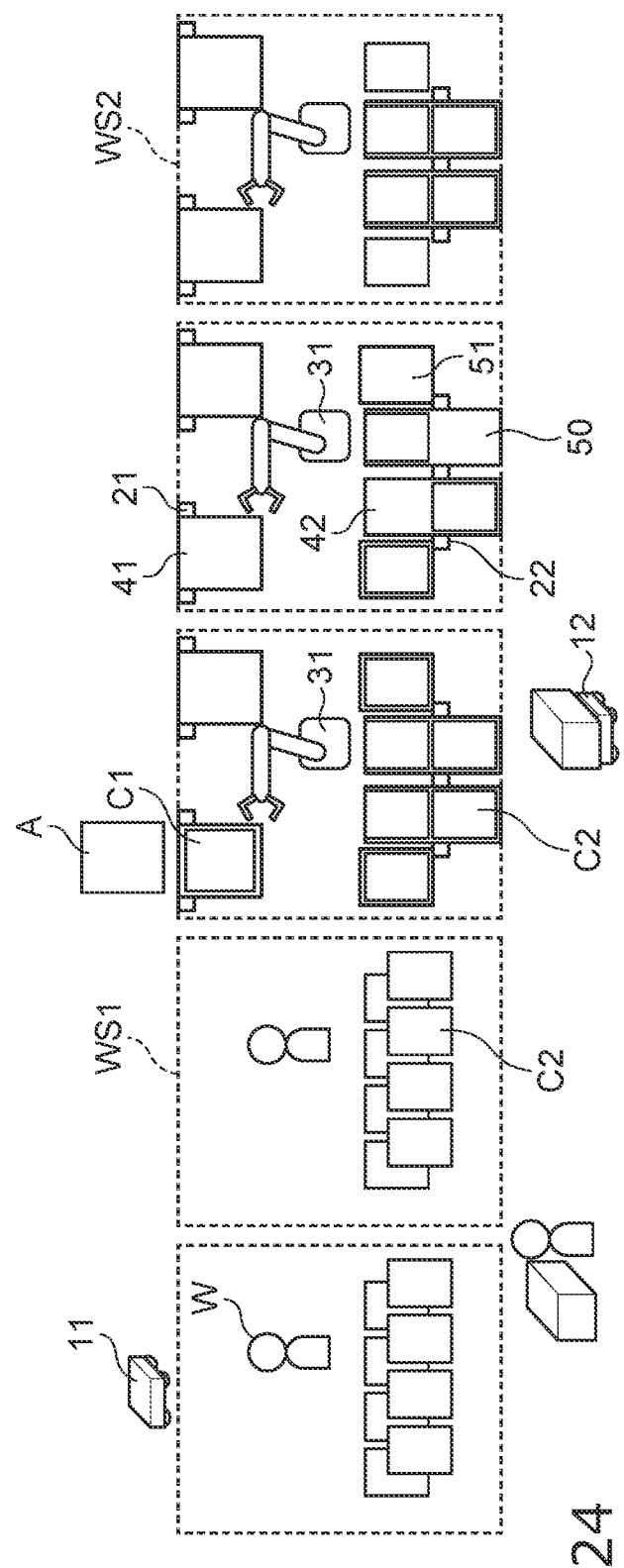
FIG. 24

FIG. 29A

| ORDER NUMBER | SUB-NUMBER | DESTINATION ID | ARTICLE NUMBER | QUANTITY | SHIPPING INFORMATION | APPURTENANT INFORMATION |
|---|---|---|---|---|---|---|
| XXX0001 | 01 | ZZZZ01 | YYYY001 | 1 | MAR06AM | |
| XXX0001 | 01 | ZZZZ01 | YYYY002 | 1 | MAR06AM | |
| XXX0001 | 01 | ZZZZ01 | YYYY005 | 1 | MAR06AM | |
| XXX0001 | 01 | ZZZZ01 | YYYY006 | 1 | MAR05AM | |
| XXX0002 | 01 | ZZZZ02 | YYYY002 | 1 | MAR06AM | |
| XXX0002 | 01 | ZZZZ02 | YYYY005 | 2 | MAR06AM | |
| XXX0002 | 01 | ZZZZ02 | YYYY009 | 1 | MAR06AM | |
| XXX0003 | 01 | ZZZZ03 | YYYY003 | 1 | MAR06AM | |
| XXX0003 | 01 | ZZZZ03 | YYYY102 | 1 | MAR06AM | fragile |
| XXX0003 | 01 | ZZZZ03 | YYYY153 | 1 | MAR06AM | fragile |
| XXX0004 | 01 | ZZZZ04 | YYYY001 | 1 | MAR06AM | |
| XXX0004 | 01 | ZZZZ04 | YYYY003 | 1 | MAR06AM | |
| XXX0004 | 01 | ZZZZ04 | YYYY103 | 1 | MAR06AM | |
| XXX0004 | 01 | ZZZZ04 | YYYY004 | 1 | MAR06AM | |
| XXX0005 | 01 | ZZZZ05 | YYYY003 | 1 | MAR06AM | |
| XXX0005 | 01 | ZZZZ05 | YYYY005 | 1 | MAR06AM | |
| XXX0005 | 01 | ZZZZ05 | YYYY004 | 1 | MAR06AM | |
| XXX0005 | 01 | ZZZZ05 | YYYY007 | 1 | MAR06AM | |
| XXX0005 | 01 | ZZZZ05 | YYYY008 | 1 | MAR06AM | |
| XXX0005 | 01 | ZZZZ05 | YYYY009 | 1 | MAR06AM | |
| XXX0006 | 01 | ZZZZ06 | YYYY004 | 1 | MAR06AM | |
| XXX0006 | 01 | ZZZZ06 | YYYY005 | 1 | MAR06AM | |
| XXX0006 | 01 | ZZZZ06 | YYYY008 | 1 | MAR06AM | |
| XXX0007 | 01 | ZZZZ07 | YYYY005 | 1 | MAR06AM | |
| XXX0007 | 01 | ZZZZ07 | YYYY006 | 1 | MAR06AM | |
| XXX0007 | 02 | ZZZZ07 | YYYY025 | 1 | MAR06PM | |
| XXX0007 | 02 | ZZZZ07 | YYYY020 | 1 | MAR06PM | |
| XXX0008 | 01 | ZZZZ08 | YYYY110 | 1 | MAR06AM | |
| XXX0008 | 01 | ZZZZ08 | YYYY007 | 1 | MAR06AM | |
| XXX0009 | 01 | ZZZZ09 | YYYY010 | 2 | MAR06AM | |

FIG. 29B

| ARTICLE NUMBER | QUANTITY | SHELF ID | SUB-SHELF ID | CONTAINER ID | SUB-CONTAINER ID | FLOOR ID |
|---|---|---|---|---|---|---|
| YYYY001 | 5 | AAA001 | 7 | BBB007 | 1 | 1F |
| YYYY001 | 5 | AAA002 | 5 | BBB005 | 5 | 1F |
| YYYY002 | 5 | AAA002 | 8 | BBB008 | 5 | 1F |
| YYYY003 | 5 | AAA003 | 8 | BBB008 | 4 | 1F |
| YYYY004 | 5 | AAA004 | 7 | BBB007 | 7 | 1F |
| YYYY005 | 5 | AAA005 | 0 | BBB000 | 8 | 1F |
| YYYY006 | 5 | AAA006 | 5 | BBB005 | 2 | 1F |
| YYYY007 | 8 | AAA007 | 3 | BBB003 | 4 | 1F |
| YYYY008 | 5 | AAA008 | 5 | BBB005 | 6 | 1F |
| YYYY009 | 3 | AAA009 | 6 | BBB006 | 7 | 1F |
| YYYY010 | 5 | AAA010 | 3 | BBB003 | 3 | 1F |
| YYYY020 | 5 | AAA011 | 8 | BBB008 | 1 | 2F |
| YYYY025 | 4 | AAA012 | 2 | BBB002 | 3 | 1F |
| YYYY053 | 5 | AAA013 | 8 | BBB008 | 4 | 1F |
| YYYY102 | 2 | AAA014 | 4 | BBB004 | 6 | 2F |
| YYYY103 | 5 | AAA003 | 8 | BBB008 | 7 | 1F |
| YYYY110 | 5 | AAA015 | 2 | BBB002 | 7 | 2F |

FIG. 30

| ORDER NUMBER | SUB-NUMBER | DESTINATION ID | ARTICLE NUMBER | QUANTITY | SHIPPING INFORMATION | APPURTENANT INFORMATION | SHELF ID | SUB-SHELF ID | CONTAINER ID | SUB-CONTAINER ID | FLOOR ID |
|---|---|---|---|---|---|---|---|---|---|---|---|
| XXX0001 | 01 | ZZZZ01 | YYYY001 | 1 | MAR06AM | | AAA002 | 5 | BBB005 | 5 | 1F |
| XXX0001 | 01 | ZZZZ01 | YYYY002 | 1 | MAR06AM | | AAA002 | 8 | BBB008 | 5 | 1F |
| XXX0001 | 01 | ZZZZ01 | YYYY005 | 1 | MAR06AM | | AAA005 | 0 | BBB000 | 8 | 1F |
| XXX0001 | 01 | ZZZZ01 | YYYY006 | 1 | MAR06AM | | AAA006 | 5 | BBB005 | 2 | 1F |
| XXX0002 | 01 | ZZZZ02 | YYYY002 | 2 | MAR06AM | | AAA002 | 8 | BBB008 | 5 | 1F |
| XXX0002 | 01 | ZZZZ02 | YYYY005 | 1 | MAR06AM | | AAA005 | 0 | BBB000 | 8 | 1F |
| XXX0002 | 01 | ZZZZ02 | YYYY009 | 1 | MAR06AM | | AAA009 | 6 | BBB006 | 7 | 1F |
| XXX0003 | 01 | ZZZZ03 | YYYY003 | 1 | MAR06AM | fragile | AAA003 | 8 | BBB008 | 4 | 1F |
| XXX0003 | 01 | ZZZZ03 | YYYY102 | 1 | MAR06AM | fragile | AAA014 | 4 | BBB004 | 6 | 2F |
| XXX0003 | 01 | ZZZZ03 | YYYY153 | 1 | MAR05AM | | AAA013 | 8 | BBB008 | 4 | 1F |
| XXX0004 | 01 | ZZZZ04 | YYYY001 | 1 | MAR06AM | | AAA002 | 5 | BBB005 | 5 | 1F |
| XXX0004 | 01 | ZZZZ04 | YYYY003 | 1 | MAR06AM | | AAA003 | 8 | BBB008 | 4 | 1F |
| XXX0004 | 01 | ZZZZ04 | YYYY004 | 1 | MAR06AM | | AAA004 | 7 | BBB007 | 7 | 1F |
| XXX0004 | 01 | ZZZZ04 | YYYY103 | 1 | MAR06AM | | AAA003 | 8 | BBB008 | 7 | 1F |
| XXX0005 | 01 | ZZZZ05 | YYYY003 | 1 | MAR06AM | | AAA003 | 8 | BBB008 | 4 | 1F |
| XXX0005 | 01 | ZZZZ05 | YYYY004 | 1 | MAR06AM | | AAA004 | 7 | BBB007 | 7 | 1F |
| XXX0005 | 01 | ZZZZ05 | YYYY007 | 1 | MAR06AM | | AAA007 | 3 | BBB003 | 4 | 1F |
| XXX0005 | 01 | ZZZZ05 | YYYY008 | 1 | MAR06AM | | AAA008 | 5 | BBB005 | 6 | 1F |
| XXX0006 | 01 | ZZZZ06 | YYYY009 | 1 | MAR06AM | | AAA009 | 6 | BBB006 | 7 | 1F |
| XXX0006 | 01 | ZZZZ06 | YYYY004 | 1 | MAR06AM | | AAA004 | 7 | BBB007 | 7 | 1F |
| XXX0006 | 01 | ZZZZ06 | YYYY005 | 1 | MAR06AM | | AAA005 | 0 | BBB000 | 8 | 1F |
| XXX0006 | 01 | ZZZZ06 | YYYY008 | 1 | MAR06AM | | AAA008 | 5 | BBB005 | 6 | 1F |
| XXX0007 | 01 | ZZZZ07 | YYYY005 | 1 | MAR06AM | | AAA005 | 0 | BBB000 | 8 | 1F |
| XXX0007 | 02 | ZZZZ07 | YYYY006 | 1 | MAR05AM | | AAA006 | 5 | BBB005 | 2 | 1F |
| XXX0007 | 02 | ZZZZ07 | YYYY025 | 1 | MAR05AM | | AAA012 | 2 | BBB002 | 3 | 1F |
| XXX0008 | 01 | ZZZZ08 | YYYY020 | 1 | MAR06AM | | AAA011 | 8 | BBB008 | 1 | 2F |
| XXX0008 | 01 | ZZZZ08 | YYYY110 | 1 | MAR06AM | | AAA015 | 2 | BBB002 | 7 | 2F |
| XXX0009 | 01 | ZZZZ09 | YYYY007 | 1 | MAR06AM | | AAA007 | 3 | BBB003 | 4 | 1F |
| XXX0009 | 02 | ZZZZ09 | YYYY010 | 2 | MAR06AM | | AAA010 | 3 | BBB003 | 3 | 1F |

| ORDER NUMBER | SUB-NUMBER | DESTINATION ID | ARTICLE NUMBER | QUANTITY | SHIPPING INFORMATION | APPURTENANT INFORMATION | SHELF ID | SUB-SHELF ID | CONTAINER ID | SUB-CONTAINER ID | FLOOR ID |
|---|---|---|---|---|---|---|---|---|---|---|---|
| XXX0001 | 01 | ZZZZ01 | YYYY001 | 1 | MAR06AM | | AAA002 | 5 | BBB005 | 5 | 1F |
| XXX0001 | 01 | ZZZZ01 | YYYY002 | 1 | MAR06AM | | AAA002 | 8 | BBB008 | 5 | 1F |
| XXX0001 | 01 | ZZZZ01 | YYYY005 | 1 | MAR06AM | | AAA005 | 0 | BBB000 | 8 | 1F |
| XXX0001 | 01 | ZZZZ01 | YYYY006 | 1 | MAR06AM | | AAA006 | 5 | BBB005 | 2 | 1F |
| XXX0002 | 01 | ZZZZ02 | YYYY002 | 1 | MAR06AM | | AAA002 | 8 | BBB008 | 5 | 1F |
| XXX0002 | 01 | ZZZZ02 | YYYY005 | 1 | MAR06AM | | AAA005 | 0 | BBB000 | 8 | 1F |
| XXX0002 | 01 | ZZZZ02 | YYYY009 | 1 | MAR06AM | | AAA009 | 6 | BBB006 | 7 | 1F |
| XXX0002 | 01 | ZZZZ02 | YYYY001 | 1 | MAR06AM | | AAA002 | 5 | BBB005 | 5 | 1F |
| XXX0004 | 01 | ZZZZ04 | YYYY003 | 1 | MAR06AM | | AAA003 | 8 | BBB008 | 4 | 1F |
| XXX0004 | 01 | ZZZZ04 | YYYY004 | 1 | MAR06AM | | AAA004 | 7 | BBB007 | 7 | 1F |
| XXX0004 | 01 | ZZZZ04 | YYYY103 | 1 | MAR06AM | | AAA003 | 8 | BBB008 | 7 | 1F |
| XXX0005 | 01 | ZZZZ05 | YYYY003 | 1 | MAR06AM | | AAA003 | 8 | BBB008 | 4 | 1F |
| XXX0005 | 01 | ZZZZ05 | YYYY004 | 1 | MAR06AM | | AAA004 | 7 | BBB007 | 7 | 1F |
| XXX0005 | 01 | ZZZZ05 | YYYY007 | 1 | MAR06AM | | AAA007 | 3 | BBB003 | 4 | 1F |
| XXX0005 | 01 | ZZZZ05 | YYYY008 | 1 | MAR06AM | | AAA008 | 5 | BBB005 | 6 | 1F |
| XXX0005 | 01 | ZZZZ05 | YYYY009 | 1 | MAR06AM | | AAA009 | 6 | BBB006 | 7 | 1F |
| XXX0006 | 01 | ZZZZ06 | YYYY004 | 1 | MAR06AM | | AAA004 | 7 | BBB007 | 7 | 1F |
| XXX0006 | 01 | ZZZZ06 | YYYY005 | 1 | MAR06AM | | AAA005 | 0 | BBB000 | 8 | 1F |
| XXX0006 | 01 | ZZZZ06 | YYYY008 | 1 | MAR06AM | | AAA008 | 5 | BBB005 | 6 | 1F |
| XXX0009 | 01 | ZZZZ09 | YYYY007 | 1 | MAR06AM | | AAA007 | 3 | BBB003 | 4 | 1F |
| XXX0009 | 02 | ZZZZ09 | YYYY010 | 1 | MAR06AM | | AAA010 | 3 | BBB003 | 3 | 1F |
| XXX0009 | 02 | ZZZZ09 | YYYY010 | 1 | MAR06AM | | AAA010 | 3 | BBB003 | 3 | 1F |

FIG. 31

| LIST NUMBER | SHELF ID | SUB-SHELF ID | CONTAINER ID | SUB-CONTAINER ID | ARTICLE NUMBER | ORDER NUMBER | SUB-NUMBER |
|---|---|---|---|---|---|---|---|
| 1 | AAA002 | 5 | BBB005 | 5 | YYYY001 | XXX0001 | 01 |
| 2 | AAA002 | 8 | BBB008 | 5 | YYYY002 | XXX0001 | 01 |
| 3 | AAA005 | 0 | BBB000 | 8 | YYYY005 | XXX0001 | 01 |
| 4 | AAA006 | 5 | BBB005 | 2 | YYYY006 | XXX0001 | 01 |
| 5 | AAA002 | 8 | BBB008 | 5 | YYYY002 | XXX0002 | 01 |
| 6 | AAA005 | 0 | BBB000 | 8 | YYYY005 | XXX0002 | 01 |
| 7 | AAA005 | 0 | BBB000 | 8 | YYYY005 | XXX0002 | 01 |
| 8 | AAA009 | 6 | BBB006 | 7 | YYYY009 | XXX0002 | 01 |
| 9 | AAA002 | 5 | BBB005 | 5 | YYYY001 | XXX0004 | 01 |
| 10 | AAA003 | 8 | BBB001 | 4 | YYYY003 | XXX0004 | 01 |
| 11 | AAA004 | 7 | BBB000 | 8 | YYYY004 | XXX0004 | 01 |
| 12 | AAA003 | 8 | BBB001 | 7 | YYYY103 | XXX0004 | 01 |
| 13 | AAA003 | 8 | BBB001 | 4 | YYYY003 | XXX0005 | 01 |
| 14 | AAA004 | 7 | BBB007 | 7 | YYYY004 | XXX0005 | 01 |
| 15 | AAA007 | 3 | BBB003 | 4 | YYYY007 | XXX0005 | 01 |
| 16 | AAA008 | 5 | BBB005 | 6 | YYYY008 | XXX0005 | 01 |
| 17 | AAA009 | 6 | BBB006 | 7 | YYYY009 | XXX0005 | 01 |
| 18 | AAA004 | 7 | BBB007 | 7 | YYYY004 | XXX0006 | 01 |
| 19 | AAA005 | 0 | BBB000 | 8 | YYYY005 | XXX0006 | 01 |
| 20 | AAA008 | 5 | BBB005 | 6 | YYYY008 | XXX0006 | 01 |
| 21 | AAA007 | 3 | BBB003 | 4 | YYYY007 | XXX0009 | 01 |
| 22 | AAA010 | 3 | BBB003 | 3 | YYYY010 | XXX0009 | 02 |
| 23 | AAA010 | 3 | BBB003 | 3 | YYYY010 | XXX0009 | 02 |

FIG. 32

| LIST NUMBER | FIRST CONTAINER NUMBER | ARTICLE NUMBER | SECOND CONTAINER NUMBER |
|---|---|---|---|
| 1 | AAA0025 | YYYY001 | XXX000101 |
| 2 | AAA0028 | YYYY002 | XXX000101 |
| 3 | AAA0050 | YYYY005 | XXX000101 |
| 4 | AAA0065 | YYYY006 | XXX000101 |
| 5 | AAA0028 | YYYY002 | XXX000201 |
| 6 | AAA0050 | YYYY005 | XXX000201 |
| 7 | AAA0050 | YYYY005 | XXX000201 |
| 8 | AAA0096 | YYYY009 | XXX000201 |
| 9 | AAA0025 | YYYY001 | XXX000401 |
| 10 | AAA0038 | YYYY003 | XXX000401 |
| 11 | AAA0047 | YYYY004 | XXX000401 |
| 12 | AAA0038 | YYYY103 | XXX000401 |
| 13 | AAA0038 | YYYY003 | XXX000501 |
| 14 | AAA0047 | YYYY004 | XXX000501 |
| 15 | AAA0073 | YYYY007 | XXX000501 |
| 16 | AAA0085 | YYYY008 | XXX000501 |
| 17 | AAA0096 | YYYY009 | XXX000501 |
| 18 | AAA0047 | YYYY004 | XXX000601 |
| 19 | AAA0050 | YYYY005 | XXX000601 |
| 20 | AAA0085 | YYYY008 | XXX000601 |
| 21 | AAA0073 | YYYY007 | XXX000901 |
| 22 | AAA0103 | YYYY010 | XXX000902 |
| 23 | AAA0103 | YYYY010 | XXX000902 |

FIG. 33

| LIST NUMBER | FIRST CONTAINER NUMBER | ARTICLE NUMBER | SECOND CONTAINER NUMBER |
|---|---|---|---|
| 1 | AAA0025 | YYYY001 | XXX000101 |
| 9 | AAA0025 | YYYY001 | XXX000401 |
| 2 | AAA0028 | YYYY002 | XXX000101 |
| 5 | AAA0028 | YYYY002 | XXX000201 |
| 10 | AAA0038 | YYYY003 | XXX000401 |
| 12 | AAA0038 | YYYY103 | XXX000401 |
| 13 | AAA0038 | YYYY003 | XXX000501 |
| 11 | AAA0047 | YYYY004 | XXX000401 |
| 14 | AAA0047 | YYYY004 | XXX000501 |
| 18 | AAA0047 | YYYY004 | XXX000601 |
| 3 | AAA0050 | YYYY005 | XXX000101 |
| 6 | AAA0050 | YYYY005 | XXX000201 |
| 7 | AAA0050 | YYYY005 | XXX000601 |
| 19 | AAA0050 | YYYY005 | XXX000101 |
| 4 | AAA0065 | YYYY006 | XXX000101 |
| 15 | AAA0073 | YYYY007 | XXX000501 |
| 21 | AAA0073 | YYYY007 | XXX000901 |
| 16 | AAA0085 | YYYY008 | XXX000501 |
| 20 | AAA0085 | YYYY008 | XXX000601 |
| 8 | AAA0096 | YYYY009 | XXX000201 |
| 17 | AAA0096 | YYYY009 | XXX000501 |
| 22 | AAA0103 | YYYY010 | XXX000902 |
| 23 | AAA0103 | YYYY010 | XXX000902 |

FIG. 34A

| LIST NUMBER | FIRST CONTAINER NUMBER | ARTICLE NUMBER | SECOND CONTAINER NUMBER |
|---|---|---|---|
| 1 | AAA0025 | YYYY001 | XXX000101 |
| 9 | AAA0025 | YYYY001 | XXX000401 |
| 2 | AAA0028 | YYYY002 | XXX000101 |
| 5 | AAA0028 | YYYY002 | XXX000201 |
| 3 | AAA0050 | YYYY005 | XXX000101 |
| 6 | AAA0050 | YYYY005 | XXX000201 |
| 7 | AAA0050 | YYYY005 | XXX000201 |
| 19 | AAA0050 | YYYY005 | XXX000601 |
| 16 | AAA0085 | YYYY008 | XXX000501 |
| 20 | AAA0085 | YYYY008 | XXX000601 |
| 8 | AAA0096 | YYYY009 | XXX000201 |
| 17 | AAA0096 | YYYY009 | XXX000501 |
| 10 | AAA0038 | YYYY003 | XXX000401 |
| 12 | AAA0038 | YYYY103 | XXX000401 |
| 13 | AAA0038 | YYYY003 | XXX000501 |
| 11 | AAA0047 | YYYY004 | XXX000401 |
| 14 | AAA0047 | YYYY004 | XXX000501 |
| 18 | AAA0047 | YYYY004 | XXX000501 |
| 15 | AAA0073 | YYYY007 | XXX000501 |
| 21 | AAA0073 | YYYY007 | XXX000601 |
| 22 | AAA0103 | YYYY010 | XXX000902 |
| 23 | AAA0103 | YYYY010 | XXX000902 |
| 4 | AAA0065 | YYYY006 | XXX000101 |

FIG. 34B

| LIST NUMBER | FIRST CONTAINER NUMBER | ARTICLE NUMBER | SECOND CONTAINER NUMBER |
| --- | --- | --- | --- |
| 1 | AAA0025 | YYYY001 | XXX000101 |
| 9 | AAA0025 | YYYY001 | XXX000401 |
| 2 | AAA0028 | YYYY002 | XXX000101 |
| 5 | AAA0028 | YYYY002 | XXX000201 |
| 3 | AAA0050 | YYYY005 | XXX000101 |
| 6 | AAA0050 | YYYY005 | XXX000201 |
| 7 | AAA0050 | YYYY005 | XXX000201 |
| 19 | AAA0065 | YYYY006 | XXX000601 |
| 4 | AAA0085 | YYYY008 | XXX000101 |
| 16 | AAA0085 | YYYY008 | XXX000501 |
| 20 | AAA0096 | YYYY009 | XXX000601 |
| 8 | AAA0096 | YYYY009 | XXX000201 |
| 17 | AAA0038 | YYYY003 | XXX000501 |
| 10 | AAA0038 | YYYY003 | XXX000401 |
| 12 | AAA0038 | YYYY103 | XXX000401 |
| 13 | AAA0047 | YYYY004 | XXX000401 |
| 11 | AAA0047 | YYYY004 | XXX000401 |
| 14 | AAA0047 | YYYY004 | XXX000601 |
| 18 | AAA0073 | YYYY007 | XXX000501 |
| 15 | AAA0073 | YYYY007 | XXX000501 |
| 21 | AAA0103 | YYYY010 | XXX000901 |
| 22 | AAA0103 | YYYY010 | XXX000902 |
| 23 | AAA0103 | YYYY010 | XXX000902 |

FIG. 35A

| LIST NUMBER | FIRST CONTAINER NUMBER | ARTICLE NUMBER | SECOND CONTAINER NUMBER |
| --- | --- | --- | --- |
| 9 | AAA0025 | YYYY001 | XXX000401 |
| 1 | AAA0025 | YYYY001 | XXX000101 |
| 2 | AAA0028 | YYYY002 | XXX000101 |
| 5 | AAA0028 | YYYY002 | XXX000201 |
| 6 | AAA0050 | YYYY005 | XXX000201 |
| 7 | AAA0050 | YYYY005 | XXX000201 |
| 4 | AAA0065 | YYYY006 | XXX000101 |
| 3 | AAA0050 | YYYY005 | XXX000101 |
| 19 | AAA0085 | YYYY008 | XXX000601 |
| 20 | AAA0085 | YYYY008 | XXX000601 |
| 16 | AAA0096 | YYYY009 | XXX000501 |
| 17 | AAA0096 | YYYY009 | XXX000501 |
| 8 | AAA0038 | YYYY003 | XXX000201 |
| 13 | AAA0038 | YYYY003 | XXX000401 |
| 10 | AAA0038 | YYYY103 | XXX000401 |
| 12 | AAA0047 | YYYY004 | XXX000401 |
| 11 | AAA0047 | YYYY004 | XXX000401 |
| 18 | AAA0047 | YYYY004 | XXX000601 |
| 14 | AAA0073 | YYYY007 | XXX000501 |
| 15 | AAA0073 | YYYY007 | XXX000501 |
| 21 | AAA0103 | YYYY010 | XXX000901 |
| 22 | AAA0103 | YYYY010 | XXX000902 |
| 23 | AAA0103 | YYYY010 | XXX000902 |

| PROCESSING TIME | FIRST TRANSFER ROBOT | | | PICKING ROBOT | | SECOND TRANSFER ROBOT | | |
|---|---|---|---|---|---|---|---|---|
| 10 | REMOVE | » | AAAA0025 | STANDBY | | XXX000401 | < | REMOVE |
| 20 | REMOVE | » | AAAA0025 AAAA0028 | PICK | → | XXX000401 XXX000101 | < | REMOVE |
| 30 | | | AAAA0025 AAAA0028 | PICK | ↗ | XXX000101 | > | FETCH |
| 40 | FETCH | « | AAAA0028 | PICK | → | XXX000201 XXX000101 | < | REMOVE |
| 50 | REMOVE | » | AAAA0028 AAAA0050 | PICK | ↗ | XXX000201 | | |
| 60 | FETCH | « | AAAA0028 AAAA0050 | PICK | → | XXX000201 XXX000101 | > | FETCH |
| 70 | REMOVE | » | AAAA0050 AAAA0065 | PICK | → | XXX000201 XXX000101 | < | REMOVE |
| 80 | | | AAAA0050 AAAA0065 | PICK | → | XXX000601 | | |
| 90 | FETCH | « | AAAA0050 | PICK | → | XXX000101 XXX000601 | > | FETCH |
| 100 | REMOVE | » | AAAA0050 AAAA0085 | PICK | → | XXX000101 XXX000501 | →< | SHIP REMOVE |
| 110 | FETCH | « | AAAA0085 | PICK | ↗ | XXX000601 XXX000501 | | |
| 120 | REMOVE | » | AAAA0085 AAAA0096 | PICK | → | XXX000501 | > | FETCH |
| 130 | | | AAAA0096 | PICK | | XXX000201 XXX000501 | < | REMOVE |
| 140 | FETCH | « | AAAA0096 | PICK | → | XXX000201 XXX000501 | | |
| 150 | REMOVE | » | AAAA0038 AAAA0096 | | | XXX000501 XXX000401 | →< | SHIP REMOVE |
| 160 | FETCH | « | AAAA0038 | PICK | → | XXX000501 XXX000401 | | |
| 170 | | | AAAA0038 AAAA0047 | PICK | ↗ | XXX000401 | > | FETCH |
| 180 | FETCH | « | AAAA0038 AAAA0047 | PICK | → | XXX000401 XXX000601 | | |
| 190 | REMOVE | » | AAAA0047 AAAA0073 | PICK | ↗ | XXX000501 XXX000601 | →< | SHIP REMOVE |
| 200 | | | AAAA0047 AAAA0073 | PICK | → | XXX000501 XXX000601 | →< | SHIP REMOVE |
| 210 | FETCH | « | AAAA0073 | PICK | ↗ | XXX000501 XXX000901 | | |
| 220 | REMOVE | » | AAAA0073 AAAA0103 | PICK | → | XXX000501 XXX000901 | →< | SHIP REMOVE |
| 230 | FETCH | | AAAA0073 AAAA0103 | PICK | → | XXX000901 XXX000902 | → | SHIP |
| 240 | FETCH | | AAAA0103 | PICK | → | XXX000902 | | |
| 250 | | | | STANDBY | | | → | SHIP |

HANDLING SYSTEM, INSTRUCTION DEVICE, HANDLING METHOD, AND STORAGE MEDIUM

CROSS-REFERENCE TO RELATED APPLICATIONS

This application is based upon and claims the benefit of priority from Japanese Patent Application No. 2021-106646, filed on Jun. 28, 2021; the entire contents of which are incorporated herein by reference.

FIELD

Embodiments described herein relate generally to a handling system, an instruction device, a handing method, and a storage medium.

BACKGROUND

There are handling systems that transport containers and move articles stored in the containers to other containers. Such systems have a need for technology that can reduce the time necessary for handling.

BRIEF DESCRIPTION OF THE DRAWINGS

FIG. 1 is a schematic view illustrating a handling system according to an embodiment;

FIGS. 6A and 6B are perspective views illustrating specific examples of a transfer robot;

FIG. 8 is a table illustrating a specific example of data related to articles;

FIG. 10 is a specific example of an order list;

FIG. 13 is a timing chart showing the timing of the processes shown in FIGS. 11A to 11D and FIGS. 12A to 12D;

FIG. 16 is a timing chart showing the timing of the processes shown in FIGS. 14A to 14D and FIGS. 15A to 15D;

FIG. 19 is a timing chart showing the timing of the processes shown in FIGS. 17A to 17D and FIGS. 18A to 18D;

FIG. 22 is a timing chart showing the timing of the processes shown in FIGS. 20A to 20D and FIGS. 21A to 21D;

FIG. 23 is a timing chart when the fifth rule and the sixth rule are not applied;

FIG. 24 is a schematic view showing a specific example of the handling system according to the embodiment;

FIGS. 29A and 29B are data for describing a specific example of optimization;

FIG. 30 is data for describing a specific example of optimization;

FIG. 31 is data for describing a specific example of optimization;

FIG. 32 is data for describing a specific example of optimization;

FIG. 33 is data for describing a specific example of optimization;

FIGS. 34A and 34B are data for describing a specific example of optimization;

FIGS. 35A and 35B are data for describing a specific example of optimization;

FIG. 36 is data for describing a specific example of optimization; and

DETAILED DESCRIPTION

Figure 2A:
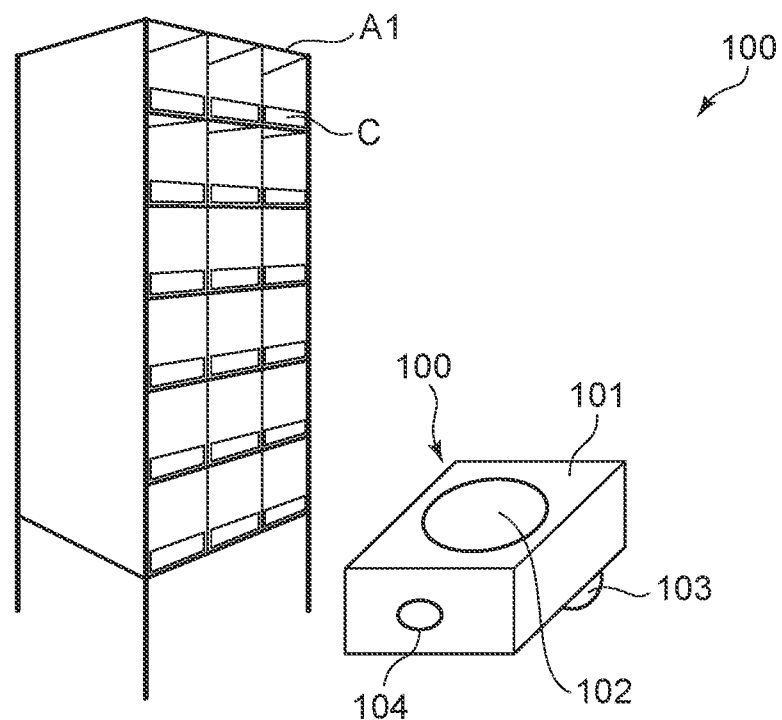
FIGS. 2A to 2C are perspective views illustrating specific examples of a mobile robot.

According to one embodiment, a handling system includes a first mobile robot, a first transfer robot, and a picking robot. The first mobile robot transports a first container out of a loading location of the first container. An article is stored in the first container. The first transfer robot transfers the first container from one of the first mobile robot or a first loading platform to the other of the first mobile robot or the first loading platform. The picking robot moves the article from the first container placed on the first loading platform to a second container placed on a second loading platform.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously are marked with like reference numerals, and a detailed description is omitted as appropriate.

FIG. 1 is a schematic view illustrating a handling system according to an embodiment.

As illustrated in FIG. 1, the handling system 1 according to the embodiment includes a first mobile robot 11, a second mobile robot 12, a first transfer robot 21, a second transfer robot 22, a picking robot 31, a first loading platform 41, a second loading platform 42, and an instruction device 90.

The first mobile robot 11 transports a first container out of a loading location at which the first container is loaded. An article is stored in the first container. One first container may store multiple articles of one type, and may store multiple types of articles. The first mobile robot 11 may be capable of transporting only one first container at a time, or may be capable of transporting multiple first containers at a time. For example, the first mobile robot 11 may transport a shelf storing multiple first containers. The first mobile robot 11 transports the first container by moving while holding the shelf or the first container. The first mobile robot 11 transports the first container to the location at which the first transfer robot 21 is installed.

The first transfer robot 21 transfers the first container from one of the first mobile robot 11 or the first loading platform 41 to the other of the first mobile robot 11 or the first loading platform 41. In other words, the first container that stores the article to be picked is transferred by the first transfer robot 21 from the first mobile robot 11 to the first loading platform 41. Also, after the picking is completed, the first transfer robot 21 transfers the first container from the first loading platform 41 to the first mobile robot 11.

The first loading platform 41 can receive the first container. For example, the first transfer robot 21 can transfer one first container at a time. For example, the first loading platform 41 can receive multiple first containers. Or, multiple first loading platforms 41 that can each receive one first container may be included.

The picking robot 31 moves the article from the first container to the second container. More specifically, the picking robot 31 picks up the article from the first container and loads the article into the second container.

Herein, the pickup and loading of articles by the picking robot 31 is called "picking" of the articles. The series of processing that includes the transport of the first container by the first mobile robot 11, the transfer of the first container by the first transfer robot 21, the picking by the picking robot 31, the transfer of the second container by the second transfer robot 22, and the transport of the second container by the second mobile robot 12 is called "handling" of the articles.

The second container can be loaded on the second loading platform 42. The picking robot 31 may be capable of picking only one article at a time, or may be capable of picking multiple articles at a time. For example, multiple second containers can be loaded on the second loading platform 42. Or, multiple second loading platforms 42 that can each receive one second container may be included.

The second transfer robot 22 transfers the second container from one of the second mobile robot 12 or the second loading platform 42 to the other of the second mobile robot 12 or the second loading platform 42. In other words, the second container in which the article is stored is transferred by the second transfer robot 22 from the second mobile robot 12 to the second loading platform 42. Also, the second container into which a picked article has been stored is transferred by the second transfer robot 22 from the second loading platform 42 to the second mobile robot 12.

The second mobile robot 12 moves while holding the second container in which the article is stored. The second container is thereby transported by the second mobile robot 12. For example, the second mobile robot 12 can transport multiple second containers at a time. The second mobile robot 12 transports the multiple second containers from the installation location of the second transfer robot 22 is to another location.

The instruction device 90 transmits an instruction to the first mobile robot 11, the second mobile robot 12, the first transfer robot 21, the second transfer robot 22, and the picking robot 31. The first mobile robot 11, the second mobile robot 12, the first transfer robot 21, the second transfer robot 22, and the picking robot 31 operate according to the instruction from the instruction device 90.

In the example of FIG. 1, first containers C1 are loaded on shelves A. The first containers C1 may be placed on the floor. Each of the multiple first mobile robots 11 transports the multiple first containers C1 stored in a portion of the multiple shelves A to the location of the first transfer robot 21. Each of the first mobile robots 11 may transport the multiple first containers C1 by transporting one shelf A.

In one transfer, the first transfer robot 21 transfers one of the multiple first containers C1 transported by one of the first mobile robots 11 to the first loading platform 41.

Two first container C1 can be loaded on the first loading platform 41. Two second container C2 can be loaded on the second loading platform 42. In an operation that includes one picking, the picking robot 31 moves one article from one of the first containers C1 loaded on the first loading platform 41 to one of the second containers C2 loaded on the second loading platform 42.

Each of the multiple second mobile robots 12 transports the multiple second containers C2 to the location of the second transfer robot 22. Each of the second mobile robots 12 may transport the multiple second containers C2 by transporting one shelf.

In one transfer, the second transfer robot 22 transfers one of the second containers C2 loaded on the second loading platform 42 to one of the second mobile robots 12.

Figure 2B:
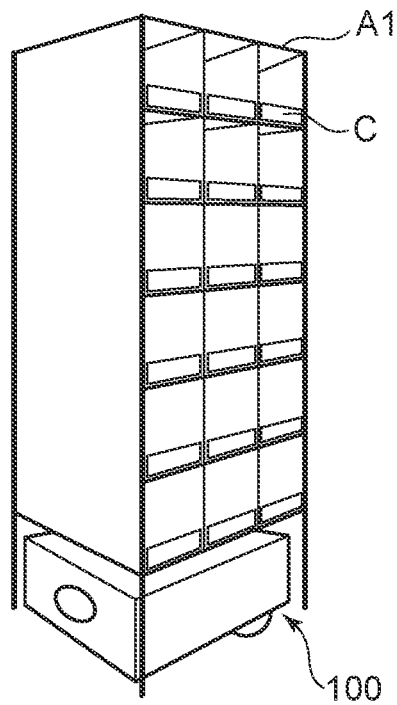
Figure 2C:
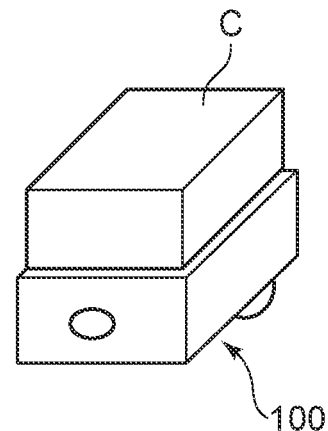

FIGS. 2A to 2C are perspective views illustrating specific examples of a mobile robot. A shelf, the first container, or the second container can be placed on the upper portion of the mobile robot 100 shown in FIG. 2A and transported by the mobile robot 100. The mobile robot 100 includes a vehicle body 101, a holder 102, a running part 103, and a detector 104.

The holder 102 is located at the upper portion of the vehicle body 101. The holder 102 can move vertically with respect to the vehicle body 101. The running part 103 includes a motor, wheels, etc., that propel the vehicle body 101. The detector 104 detects the shelf, the container, or the like to be transported. The detector 104 includes a sensor such as a camera, etc. The detector 104 may include a distance sensor, etc.

When transporting a shelf A1 as shown in FIG. 2B, the mobile robot 100 moves under the shelf A1. The holder 102 is raised to support the shelf A1 from below. The shelf A1 can be transported in this state by the operation of the running part 103. As shown in FIG. 2C, the holder 102 may support a container C from below. The container C is the first container or the second container.

Figure 3:
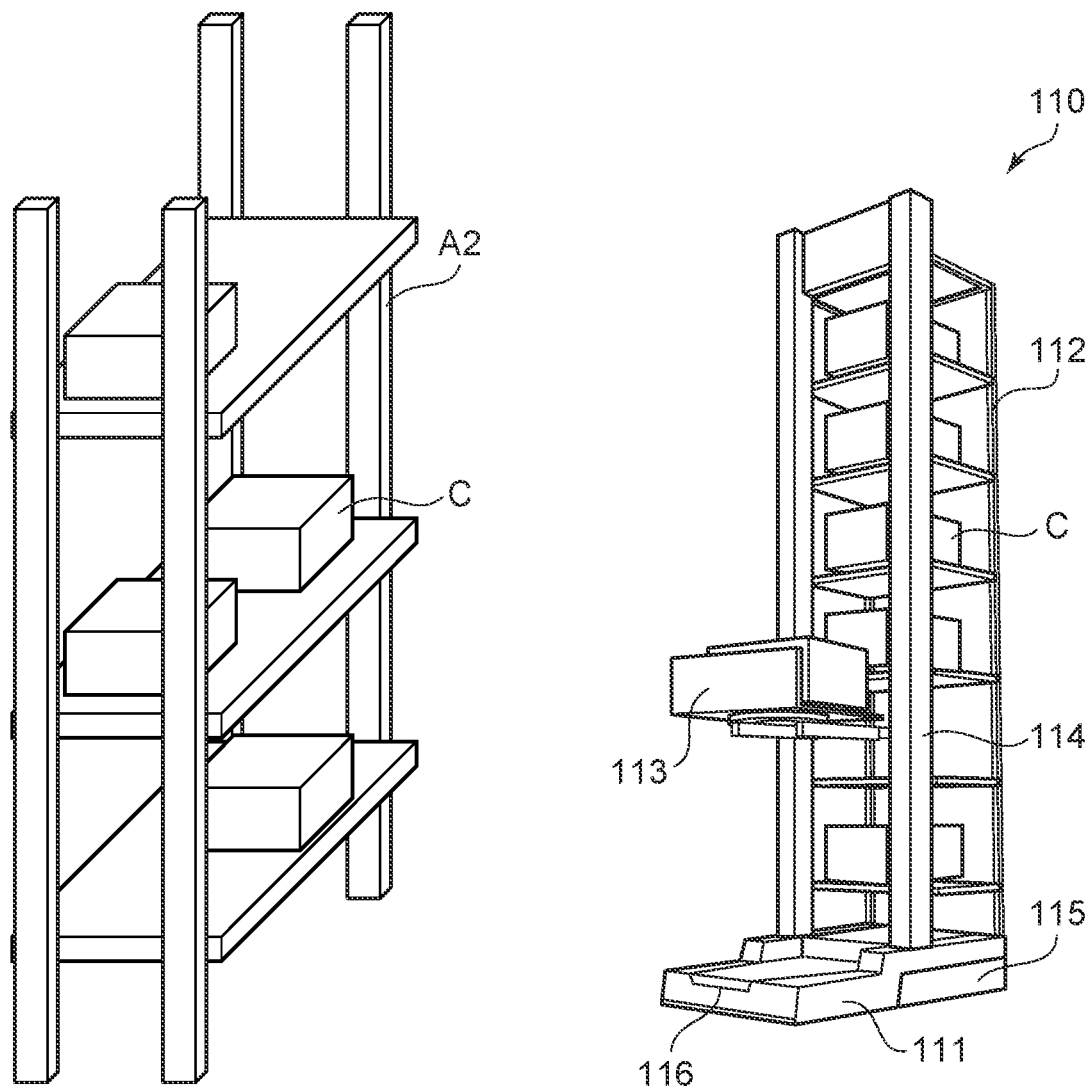
FIG. 3 is a perspective view showing another specific example of a mobile robot.

FIG. 3 is a perspective view showing another specific example of a mobile robot.

The mobile robot 110 shown in FIG. 3 includes a vehicle body 111, a storage part 112, a feeder 113, a drive mechanism 114, a running part 115, and a detector 116. The storage part 112 is located on the vehicle body 111. The storage part 112 includes multiple storage spaces arranged in the vertical direction, and the container C can be stored in each of the spaces. The container C is the first container or the second container. The feeder 113 feeds the container C from one of a shelf A2 or the storage part 112 to the other of the shelf A2 or the storage part 112. The drive mechanism 114 drives the feeder 113 along the vertical direction. The running part 115 includes a motor, wheels, etc., that propel the vehicle body 111. The detector 116 detects the shelf, the container, or the like to be transported. The detector 116 includes a sensor such as a camera, etc. The detector 116 may include a distance sensor, etc.

For example, when feeding the container C from the shelf A2, the mobile robot 110 operates the drive mechanism 114 to position the feeder 113 at the same height as the container C. The feeder 113 removes the container C from the shelf A2. The drive mechanism 114 drives the feeder 113 along the vertical direction to position the container C at the same height as a prescribed storage space. The feeder 113 stores the container C in the storage space. The mobile robot 110 can store and transport the multiple first containers in the storage part 112. Similarly, the mobile robot 110 can store and transport the multiple second containers. The second containers that are to be transported can be transferred by the mobile robot 110 to the shelf. Thereby, the second containers can be stored on the shelf.

The mobile robot 100 or 110 illustrated in FIGS. 2A to 2C or FIG. 3 can be used as the first mobile robot 11 or the second mobile robot 12. The mobile robots 100 and 110 are automatic guided vehicles (AGVs) that include a drive source and multiple rollers in the running part. The mobile robots 100 and 110 travel along a guide installed in the floor. Or, the mobile robots 100 and 110 may travel along a travel route set by the instruction device 90 or another computer. The mobile robots 100 and 110 may autonomously travel by using a sensor of the detector to adapt to the surrounding conditions.

Other than the examples illustrated in FIGS. 2A to 2C and FIG. 3, the first mobile robot 11 and the second mobile robot 12 may be an automatic guided forklift, an automatic guided crane, or a drone.

FIG. 4, FIGS. 5A and 5B, and FIGS. 6A and 6B are perspective views illustrating specific examples of transfer robots.

Figure 4:
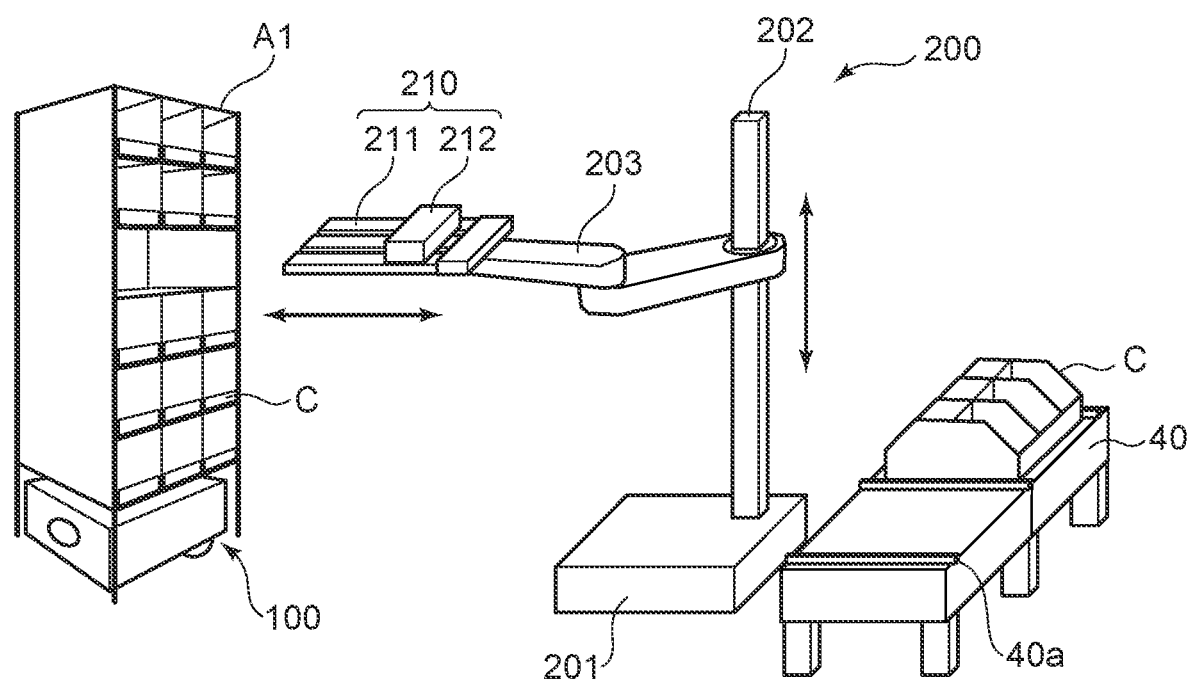
FIG. 4 is a perspective view illustrating a specific example of a transfer robot.

A transfer robot 200 shown in FIG. 4 includes a base 201, a drive mechanism 202, a manipulator 203, and an end effector 210. The base 201 is installed on the floor. The drive mechanism 202 is located on the base 201. The drive mechanism 202 drives the manipulator 203 along the vertical direction above the base 201. In the example, the manipulator 203 is horizontally articulated. The end effector 210 is mounted to the distal end of the manipulator 203.

The end effector 210 includes a fork-shaped support 211 and a gripper 212. The gripper 212 moves horizontally over the support 211. The gripper 212 grips the side surface of the container C. The support 211 supports the container C from below. The container C is held by the support 211 and the gripper 212. After being held, the container C is transferred from one of the shelf A1 or the loading platform 40 to the other of the shelf A1 or the loading platform 40 by pushing the gripper 212 horizontally with respect to the support 211 and by releasing the grip. Multiple containers C can be loaded on the loading platform 40. The loading platform 40 includes, for example, a guide mechanism 40a. The guide mechanism 40a allows precise positioning of the container C with respect to the loading platform 40. The end effector 210 may hold the container C by inserting the support 211 under the container C or by clamping a portion of the container C.

The transfer robot 200 illustrated in FIG. 4 can be used as the first transfer robot 21 or the second transfer robot 22. The loading platform 40 can be used as the first loading platform 41 or the second loading platform 42. Other than the example illustrated in FIG. 4, the transfer robot 200 may include a vertical articulated robot, a parallel link robot, or an orthogonal robot as the manipulator 203. In the example shown in FIG. 4, the transfer robot 200 transfers the container C between the loading platform 40 and the shelf A1 transported by the mobile robot 100. The transfer robot 200 also can transfer the container C between the loading platform 40 and the storage part 112 of the mobile robot 110.

Figure 5A:
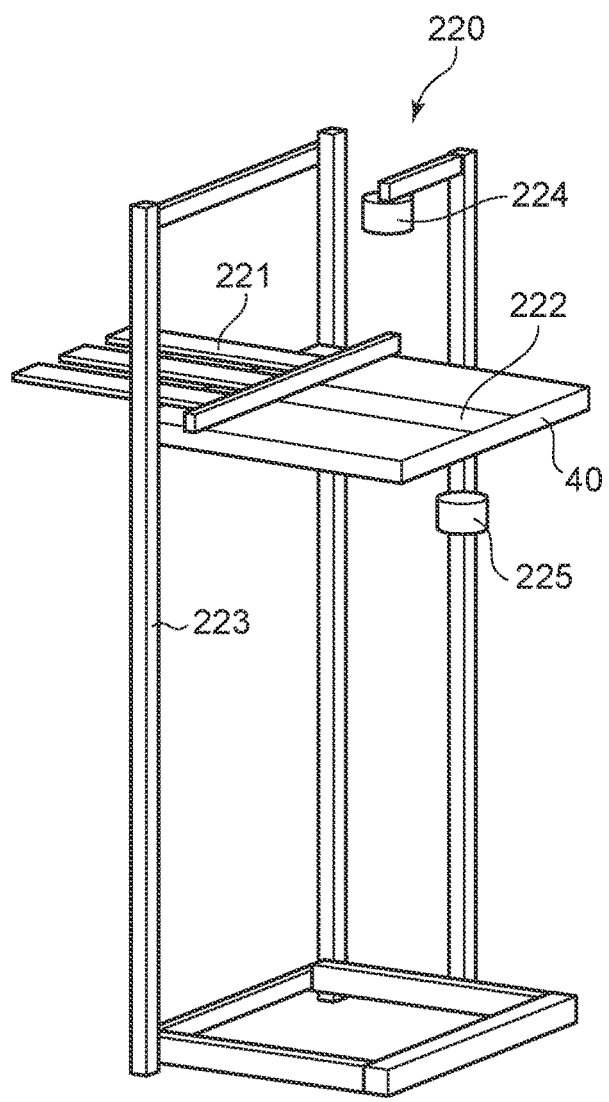
FIGS. 5A and 5B are perspective views illustrating specific examples of a transfer robot.
Figure 5B:
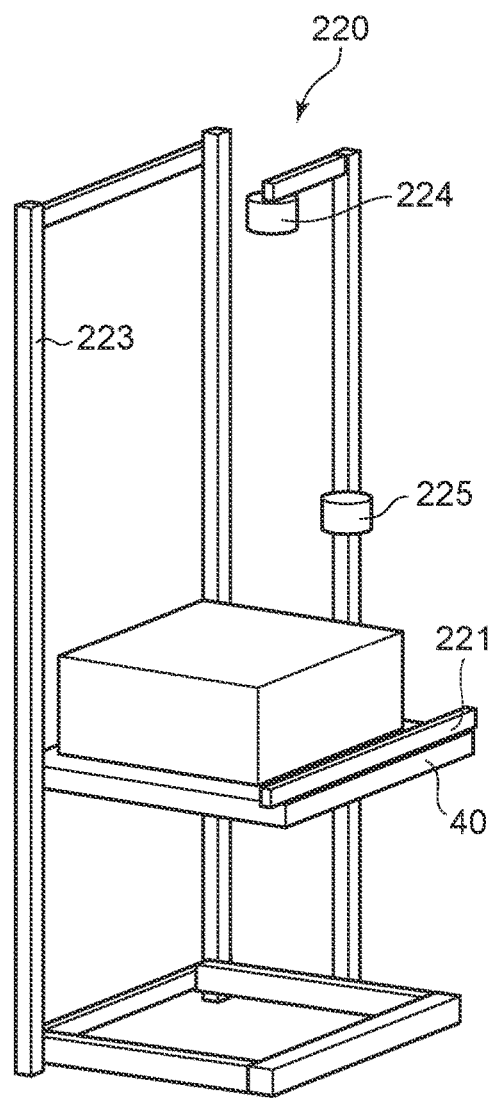

A transfer robot 220 shown in FIGS. 5A and 5B includes a holding mechanism 221 and a drive mechanism 222 for transferring the container between the mobile robot and the loading platform 40. The transfer robot 220 also includes a drive mechanism 223, a sensor 224, a sensor 225, and the loading platform 40. The holding mechanism 221 is fork-shaped and holds the container C by supporting the container C from below. The drive mechanism 222 moves the holding mechanism 221 along the longitudinal direction. The drive mechanism 223 drives the holding mechanism 221 and the drive mechanism 222 along the vertical direction. The sensor 224 detects that the container C has been transferred between the mobile robot and the loading platform 40. The sensor 225 detects that the article has been gripped by the picking robot 31. The picking robot 31 may be linked to the detection results of the sensors 224 and 225.

The following is an example when the transfer robot 220 transfers one container C from a shelf being transported by a mobile robot. The drive mechanism 223 positions the holding mechanism 221, the drive mechanism 222, and the loading platform 40 at the same height as the container C stored on the shelf. As shown in FIG. 5A, the drive mechanism 222 drives the holding mechanism 221 frontward and inserts the holding mechanism 221 under the container C. The drive mechanism 222 drives the holding mechanism 221 backward and loads the container C onto the loading platform 40. As shown in FIG. 5B, the drive mechanism 223 moves the holding mechanism 221 and the loading platform 40 along the vertical direction. For example, the drive mechanism 223 positions the loading platform 40 at the height at which the picking by the picking robot 31 is performed.

A transfer robot 230 shown in FIGS. 6A and 6B includes a drive mechanism 231 for transferring the container between the mobile robot and the loading platform 40. The transfer robot 230 also includes a drive mechanism 232, a storage part 233, a drive mechanism 234, a sensor 235, a sensor 236, and the loading platform 40. As shown in FIG. 6B, the drive mechanism 231 transfers the container C along the lateral direction between the mobile robot 110 and the loading platform 40. The drive mechanism 232 drives the loading platform 40 along the vertical direction. The storage part 233 includes storage spaces of the container C. The transfer robot 230 includes multiple storage spaces arranged in the vertical and lateral directions. The drive mechanism 234 transfers the container C along the longitudinal direction between the storage part 233 and the loading platform 40. The sensor 235 detects that the container C has been transferred between the storage part 233 and the loading platform 40. The sensor 236 detects that the article has been gripped by the picking robot 31. The picking robot 31 may be linked to the detection results of the sensors 235 and 236.

The transfer robot 230 includes an exchange mechanism 250 that includes the drive mechanism 232, the storage part 233, and the drive mechanism 234. The exchange mechanism 250 can exchange the container C loaded on the loading platform 40. Specifically, the exchange mechanism 250 stores the container C loaded on the loading platform 40 in one of the storage parts 233. The container C that is stored in another storage part 233 is placed by the exchange mechanism 250 on the loading platform 40. The mobile robot 110 and the drive mechanism 231 of the transfer robot 230 are included in a shipping mechanism 251. The shipping mechanism 251 ships the container C to be shipped. Shipping is the processing of transporting the container C storing the article from the locations of the second mobile robot, the second transfer robot, the second loading platform 42, etc., to a pickup point at which packages to be shipped are grouped.

The transfer robot 220 shown in FIGS. 5A and 5B or the transfer robot 230 shown in FIGS. 6A and 6B may be used as the first transfer robot 21 or the second transfer robot 22. The transfer robot 220 can easily transfer the article from the shelf and is especially favorable as the first transfer robot 21. The transfer robot 230 can exchange the container C of the loading platform 40 and is favorable as the second transfer robot 22.

Figure 7:
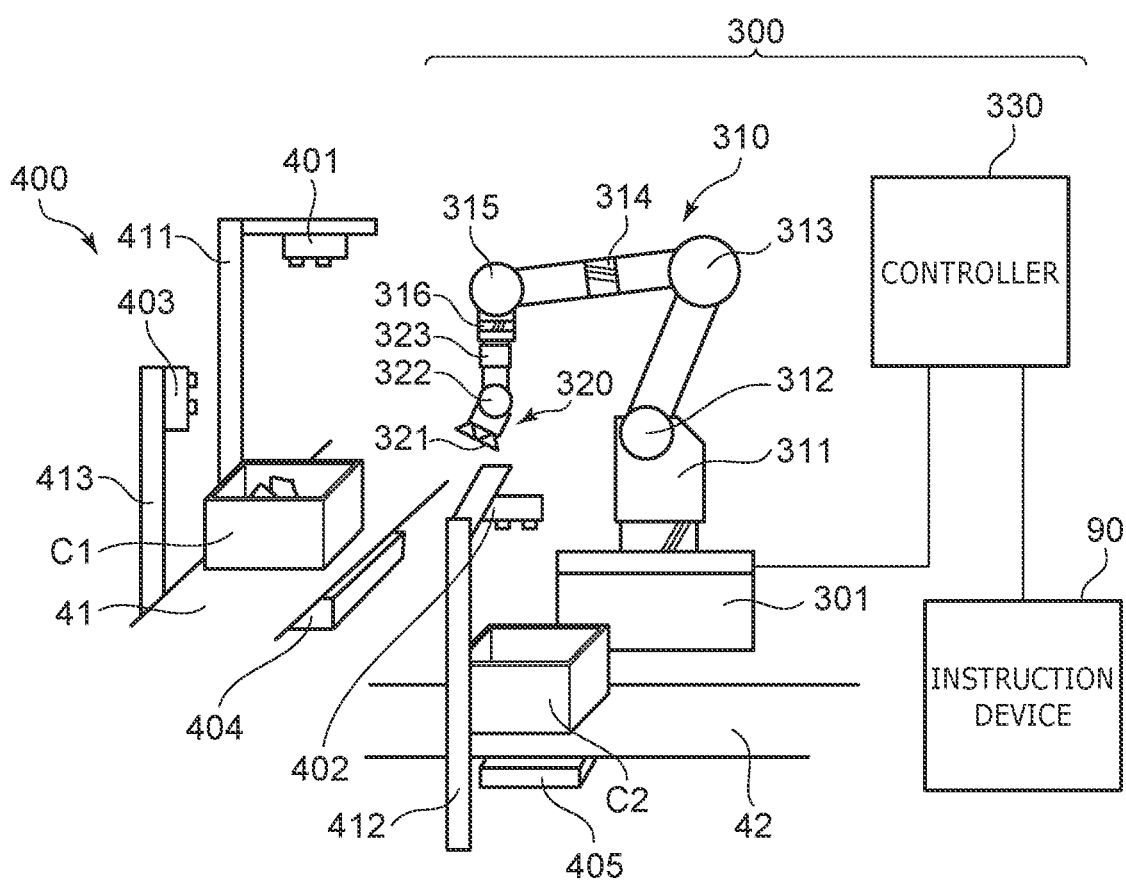
FIG. 7 is a perspective view illustrating a specific example of a picking robot.

FIG. 7 is a perspective view illustrating a specific example of a picking robot.

The picking robot 300 shown in FIG. 7 includes a manipulator 310 and an end effector 320. The manipulator 310 is an articulated robot driven by multiple servo motors. In the example shown in FIG. 7, the manipulator 310 is a vertical articulated robot with six axes, i.e., first to sixth axes 311 to 316. The manipulator 310 may include a combination of at least two selected from a vertical articulated robot, a horizontal articulated robot, a linear robot, and a parallel link robot. The end effector 320 is mounted to the distal end of the manipulator 310.

The end effector 320 includes a suction pad 321, a bending axis 322, and a force sensor 323. The suction pad 321 is located at the distal end of the end effector 320 and grips the article. The suction pad 321 is rotatable with respect to the distal end of the manipulator 310 by the bending axis 322 of the suction pad 321. The force sensor 323 detects the contact of the end effector 320 with the article. Other than suction, the end effector 320 may grip the article by jamming, clamping, gripping with a multi-finger mechanism, etc. The end effector 320 may be equipped with multiple techniques. More diverse articles can be handled thereby.

The picking robot 300 is installed on a housing 301. In the illustrated example, the end effector 320 holds the article by gripping the upper surface of the article. The picking robot 300 further includes a controller 330. The controller 330 receives the instruction from the instruction device 90. The controller 330 performs the picking by controlling the picking robot 300 according to the instruction transmitted from the instruction device 90. Thereby, the picking is automatically performed by the picking robot 300. Picking includes the processing of removing the article from the container C, placing the article in a different container or tray, boxing the article, etc.

The picking robot 300 illustrated in FIG. 7 can be used as the picking robot 31.

Other than the picking robot 300, the system for picking includes sensors, the first loading platform 41, the second loading platform 42, various sensors, power supplies, cylinders, compressors, vacuum pumps, external interfaces such as UI and the like, safety mechanisms, etc. The first container C1 that stores the article to be picked is loaded onto the first loading platform 41. The second container C2 into which the removed article is to be stored is loaded onto the second loading platform 42. The power supply supplies electrical power to the various drivers of the picking robot 300, etc. The cylinders store compressed air. The safety mechanisms include, for example, light curtains, collision detectors, etc.

For example, a sensor system 400 shown in FIG. 7 is included. The sensor system 400 includes a sensor 401, a sensor 402, a sensor 403, a sensor 404, and a sensor 405. The sensor 401 is located above the first loading platform 41 and measures the state inside the first container C1. The sensor 402 is located above the second loading platform 42 and measures the state inside the second container C2. The sensor 403 is located at the vicinity of the sensor 401 and measures the object gripped by the manipulator 310. The sensors 401 to 403 are respectively supported by supports 411 to 413. The sensors 401 to 403 include sensors that can acquire image information or three-dimensional information, such as RGB image cameras, range image cameras, laser rangefinders, light detection and ranging (LiDAR), etc. The sensor 404 measures the weight of the first container C1 loaded on the first loading platform 41. The sensor 405 measures the weight of the second container C2 loaded on the second loading platform 42.

As shown in FIG. 7, dedicated platforms may be used as the first loading platform 41 and the second loading platform 42. The holder 102 of the mobile robot 100 or the feeder 113 of the mobile robot 110 may be utilized as the loading platform.

For example, the transport sequence of the first container by the first mobile robot 11, the transport sequence of the second container by the second mobile robot 12, the transfer sequence of the first container by the first transfer robot 21, the transfer sequence of the second container by the second transfer robot 22, and the picking sequence by the picking robot 31 are instructed from the instruction device 90.

Advantages of the embodiments will now be described.

To reduce the time necessary for handling articles, it is effective to reduce the standby time during which robots are not operating. Generally, the transport of containers by mobile robots and the transfer of containers by transfer robots require more time than the picking by picking robots. If the transportation and transfer frequency of containers is high compared to picking, the standby time of the picking robot is increased, and the handling time is increased.

In the handling system 1 according to the embodiment, the first transfer robot 21 transfers the first container from one of the first mobile robot 11 or the first loading platform 41 to the other of the first mobile robot 11 or the first loading platform 41. Then, the picking robot 31 moves the article from the first container placed on the first loading platform 41 to the second container placed on the second loading platform 42. By including the first transfer robot 21 and the first loading platform 41, any of the first containers can be loaded onto the first loading platform 41 even when the first mobile robot 11 such as the mobile robot 100 or 110 transports multiple first containers. The picking robot 31 can automatically pick articles from the loaded first container to the second container. According to the handling system 1 according to the embodiment, the processing necessary for the handling of articles can be more automated, and human work can be reduced.

Favorably, the first mobile robot 11 transports multiple first containers storing multiple articles of mutually-different types. The number of times that the first mobile robot 11 moves to transport the first container can be reduced thereby, and the time necessary for handling can be reduced.

Favorably, the instruction device 90 generates instructions according to at least one selected from first to sixth rules described below, and transmits the instructions to the robots. The standby time of the picking robot 31 can be reduced thereby, and the time necessary for handling can be reduced.

The instruction device 90 generates the instructions according to the multiple rules while referring to order lists and data related to the articles.

Figure 9:
FIG. 9 is a table illustrating a specific example of data related to articles.

FIGS. 8 and 9 are tables illustrating specific examples of data related to the articles. Article management data D1 illustrated in FIG. 8 includes the article ID, the article name, the article information, the storage management information, etc. The article information includes the weight of the article and the size of the article. The article management data D1 may further include features of the article, etc. The storage management information includes the quantity of the article and the storage location of the article that is stored. Specifically, the storage management information includes the shelf ID, the sub-shelf ID, the container ID, and the sub-container ID. The shelf ID is the identification number of the shelf storing the article. The sub-shelf ID is an identification number that indicates the level of the shelf storing the article. The container ID is the identification number of the container stored on the shelf. The sub-container ID is the identification number of the subdivided region inside the container. There are cases where the same article is stored at multiple locations, as in the case of the article ID "MMMM002".

Shelf management data S1 illustrated in FIG. 9 includes the shelf ID, the shelf position information, and the shelf status. The shelf position information includes the floor ID, the area ID, the position, etc. The floor ID is an identification number that indicates the floor on which the shelf is placed. The area ID is an identification number that indicates the position of the area within the floor. The position shows the location of the shelves inside the area as grid-like position information. The shelf status indicates the state of the shelf. In the shelf status, the information that indicates the state of the shelf as being movable, already in transit due to a mobile robot, etc., is sequentially updated.

FIG. 10 is a specific example of an order list.

The order list L1 illustrated in FIG. 10 includes the list number, the shipping box number, the destination ID, the article number, the quantity, the shipping information, the appurtenant information, etc. The shipping box number includes the order number and the sub-number. The sub-number is information for identifying that the order is divided into multiple sub-parts. The destination is identified by the destination ID. The shipping information includes information such as the shipping deadline, etc. The appurtenant information includes cautionary information related to the handling of the ordered articles, etc.

The instruction device 90 can use the article management data D1 to search for the shelf and the container that stores each article of the order list. Then, the instruction device 90 can use the shelf management data S1 to search for the position at which the shelf is placed. Furthermore, the instruction device 90 can use the shelf management data S1 to check whether or not the searched shelf is movable, and can instruct the first mobile robot 11 to transport the shelf.

FIGS. 11A to 11D and FIGS. 12A to 12D are schematic views for describing a rule related to the instructions.

According to the first rule, the instruction of the processing is an instruction to determine the sequence so that articles from not less than two first containers are moved to one second container placed on the second loading platform. According to the second rule, the instruction of the processing is an instruction to determine the sequence so that articles from one first container placed on the first loading platform 41 are moved to multiple second containers. The first rule and the second rule will now be described using FIGS. 11A to 12D.

Figure 11A:
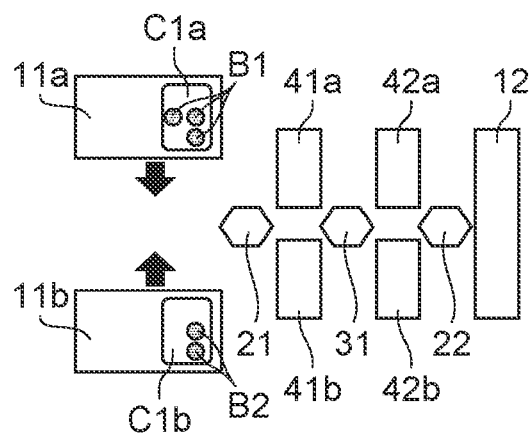
FIGS. 11A to 11D are schematic views for describing a rule related to the instruction.

The instruction device 90 refers to the article data and the order list. According to the first rule, the instruction device 90 searches for multiple articles included in one order that are stored in multiple mutually-different first containers. As a result, for example, as illustrated in FIG. 11A, the first mobile robot 11a is instructed to transport a container group including a first container C1a. A first mobile robot 11b is instructed to transport a container group including a first container C1b. Here, an article B1 that is stored in the first container C1a and an article B2 that is stored in the first container C1b are included in one order.

Figure 11B:
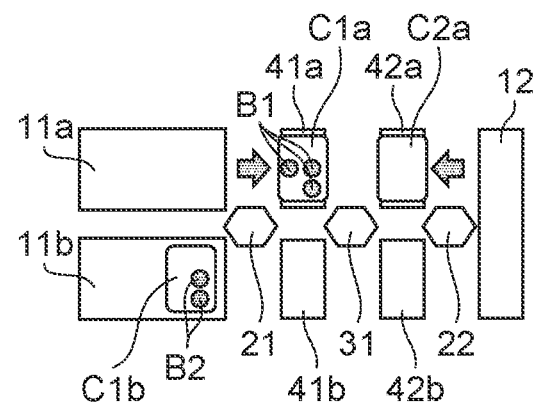

As illustrated in FIG. 11B, the instruction device 90 transmits an instruction to the first transfer robot 21 to transfer the first container C1a to a first loading platform 41a. The instruction device 90 transmits an instruction to the second transfer robot 22 to transfer one second container C2a to a second loading platform 42a. The second container C2a is associated with the one order.

Figure 11C:
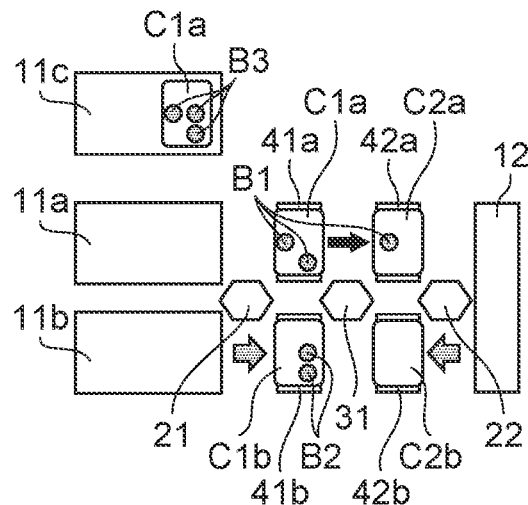

As illustrated in FIG. 11C, the instruction device 90 transmits an instruction to the picking robot 31 to move the article B1 stored in the first container C1a to the second container C2a. Also, the instruction device 90 transmits an instruction to the first transfer robot 21 to transfer the first container C1b to a first loading platform 41b. The instruction device 90 transmits an instruction to a first mobile robot 11c to transport a container group including a first container C1c to the location at which the first loading platform 41a is installed.

Then, according to the second rule, the instruction device 90 searches for another order that includes the article B2 stored in the first container C1b. As a result, the instruction device 90 transmits an instruction to the second transfer robot 22 to transfer a second container C2b to a second loading platform 42b. The transfer of the first container C1b and the transfer of the second container C2b are performed in parallel with the picking of the article B1.

Figure 11D:
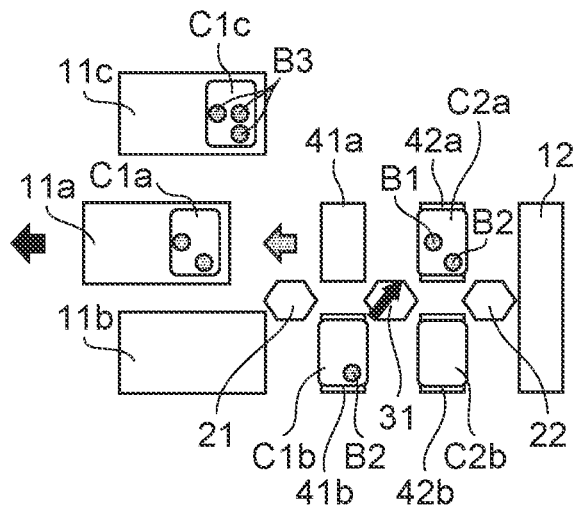

As illustrated in FIG. 11D, the instruction device 90 transmits an instruction to the picking robot 31 to move the article B2 stored in the first container C1b to the second container C2a. Also, the instruction device 90 transmits an instruction to the first transfer robot 21 to transfer the first container C1a to the first mobile robot 11a. The transfer of the first container C1a is performed in parallel with the picking of the article B2. Also, the instruction device 90 transmits an instruction to the first mobile robot 11a to transport the container group including the first container C1a out of the location at which the first loading platform 41a is installed.

Figure 12A:
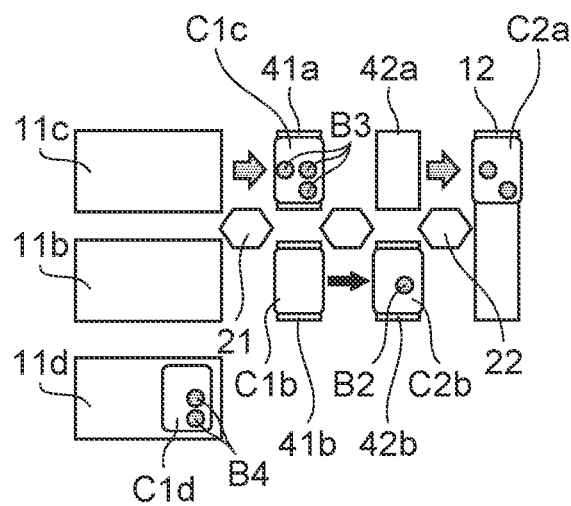
FIGS. 12A to 12D are schematic views for describing a rule related to the instruction.

As illustrated in FIG. 12A, the instruction device 90 transmits an instruction to the first transfer robot 21 to transfer the first container C1c to the first loading platform 41a. Also, the instruction device 90 transmits an instruction to the second transfer robot 22 to transfer the second container C2a storing the articles B1 and B2 to the second mobile robot 12. The instruction device 90 transmits an instruction to the picking robot 31 to move the article B2 stored in the first container C1b to the second container C2b. The transfer of the first container C1c and the transfer of the second container C2a are performed in parallel with the picking of the article B2. By applying the second rule, the articles can be consecutively transferred from the first container C1b to two second containers, i.e., the second container C2a and the second container C2b.

Figure 12B:
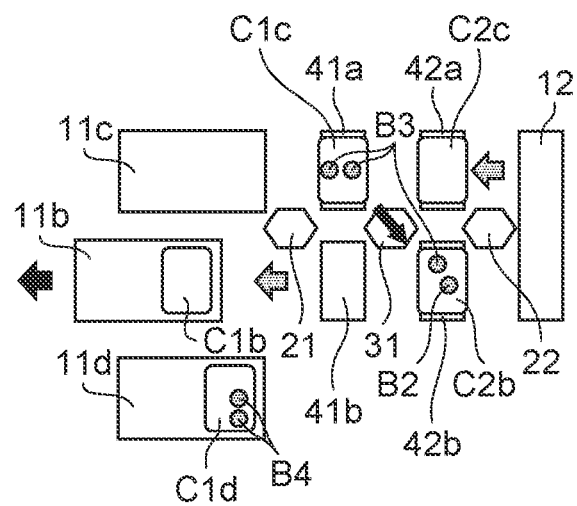

As illustrated in FIG. 12B, the instruction device 90 transmits an instruction to the picking robot 31 to move an article B3 stored in the first container C1c to the second container C2b. Also, the instruction device 90 transmits an instruction to the first transfer robot 21 to transfer the first container C1b to the first mobile robot 11b. The instruction device 90 transmits an instruction to the second transfer robot 22 to transfer a second container C2c to the second loading platform 42a. The transfer of the first container C1b and the transfer of the second container C2c are performed in parallel with the picking of the article B3.

Figure 12C:
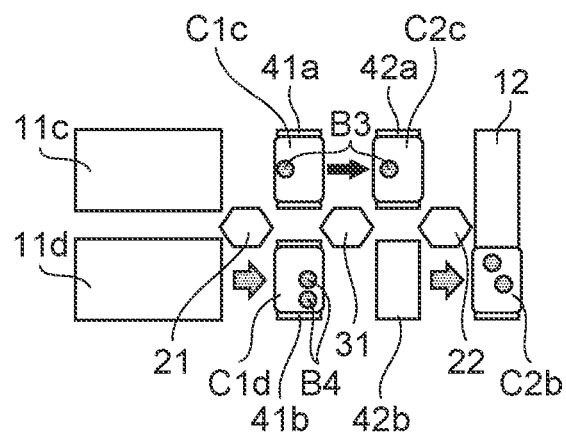

As illustrated in FIG. 12C, the instruction device 90 transmits an instruction to the picking robot 31 to move the article B3 stored in the first container C1c to the second container C2c. Also, the instruction device 90 transmits an instruction to the first transfer robot 21 to transfer a first container C1d to the first loading platform 41b. The instruction device 90 transmits an instruction to the second transfer robot 22 to transfer the second container C2b storing the articles B2 and B3 to the second mobile robot 12. The transfer of the first container C1d and the transfer of the second container C2b are performed in parallel with the picking of the article B3.

Figure 12D:
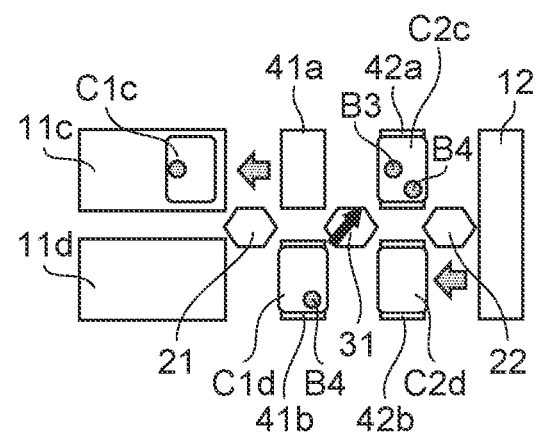

As illustrated in FIG. 12D, the instruction device 90 transmits an instruction to the picking robot 31 to move an article B4 stored in the first container C1d to the second container C2c. Also, the instruction device 90 transmits an instruction to the first transfer robot 21 to transfer the first container C1c to the first mobile robot 11c. The instruction device 90 transmits an instruction to the second transfer robot 22 to transfer a second container C2d to the second loading platform 42b. The transfer of the first container C1c and the transfer of the second container C2d are performed in parallel with the picking of the article B4.

FIG. 13 is a timing chart showing the timing of the processes shown in FIGS. 11A to 11D and FIGS. 12A to 12D.

In FIG. 13, the columns show the elapsed time. The rows show the executed processing. The hatched cells show the times at which the robots are operating. The numbers recited in the cells show the numbers of the first container, the second container, and the article processed by the robots. According to the first rule, the sequence is determined so that articles from not less than two first containers are consecutively moved to one second container. According to the second rule, the sequence is determined so that articles are consecutively moved from one first container to multiple second containers. As a result, the standby time of the robots can be reduced, and the throughput of the article handling is improved.

FIGS. 14A to 14D and FIGS. 15A to 15D are schematic views for describing a rule related to the instructions.

According to the third rule, the instruction of the processing is such that, when a number (a first number) of articles in one first container placed on the first loading platform and assigned to be transferred to the second container is low, the instruction causes the selection of another first container having more articles than the first number assigned to be transferred to the second container, and causes the selected other first container to be placed on the first loading platform. The third rule will now be described using FIGS. 14A to 15D.

The instruction device 90 refers to the article data and the order list. The instruction device 90 determines whether or not the quantity of the same article included in the order is one, or the quantity of the same article included in the order is small compared to the average same-article quantity of the entire order list to be processed. When the quantity of the same article is determined to be one or less than the average, the instruction device 90 determines the processing sequence according to the third rule so that the handling of the article is performed in parallel with the handling of another article. The handling of the other article is selected to be handling of a quantity of the same article included in one or multiple orders that is more than the handling of the former. For example, the handling of the other article is selected to be handling of a quantity of the same article included in one or multiple orders that is more than the average same-article quantity of the entire order list. When there are multiple handling that may be selected, the instruction device 90 determines the sequence to make the average same-article quantity of the first containers processed simultaneously or as a pair on the first loading platform 41 to be as uniform as possible. However, here, the same article means articles that are stored in the first container and can be loaded on the same first loading platform at one time. In other words, even if the article IDs of the articles are different, the processing time of the articles can be similarly handled as long as the articles are stored in a container having the same container ID.

Figure 14A:
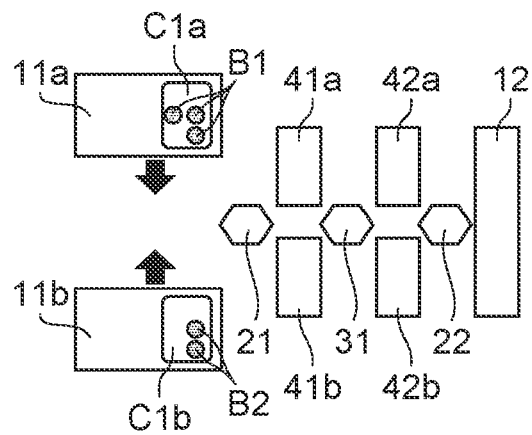
FIGS. 14A to 14D are schematic views for describing a rule related to the instruction.

As a result, for example, as illustrated in FIG. 14A, the first mobile robot 11a is instructed to transport a container group including the first container C1a. The first mobile robot 11b is instructed to transport a container group including the first container C1b. The first mobile robots 11a and 11b may transport shelves storing the container groups. Here, multiple articles B1 stored in the first container C1a are ordered, while only one article B2 stored in the first container C1b is ordered.

Figure 14B:
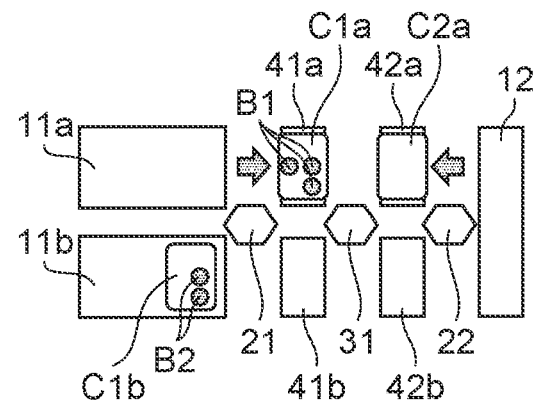

As illustrated in FIG. 14B, the instruction device 90 transmits an instruction to the first transfer robot 21 to transfer the first container C1a to the first loading platform 41a. The instruction device 90 transmits an instruction to the second transfer robot 22 to transfer one second container C2a to the second loading platform 42a. The transfer of the first container C1a and the transfer of the second container C2a are performed in parallel.

Figure 14C:
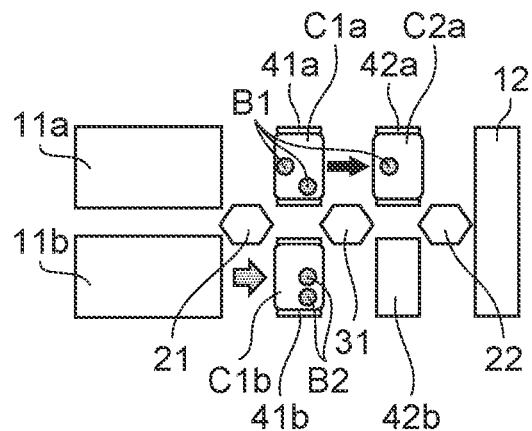

As illustrated in FIG. 14C, the instruction device 90 transmits an instruction to the picking robot 31 to move the article B1 stored in the first container C1a to the second container C2a. The instruction device 90 transmits an instruction to the first transfer robot 21 to transfer the first container C1b to the first loading platform 41b. The transfer of the first container C1b is performed in parallel with the picking of the article B1.

Figure 14D:
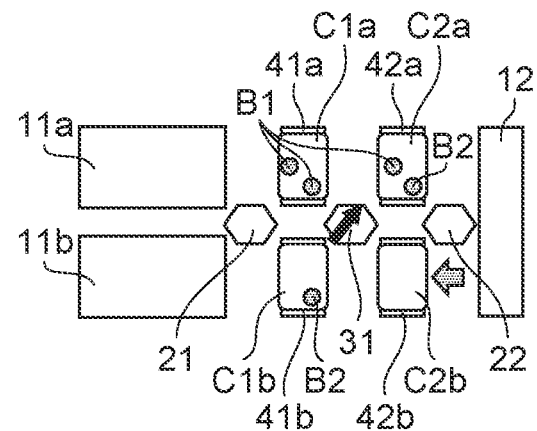

As illustrated in FIG. 14D, the instruction device 90 transmits an instruction to the picking robot 31 to move the article B2 stored in the first container C1b to the second container C2a. Also, the instruction device 90 transmits an instruction to the second transfer robot 22 to transfer the second container C2b to the second loading platform 42b. The transfer of the second container C2b is performed in parallel with the picking of the article B2.

Figure 15A:
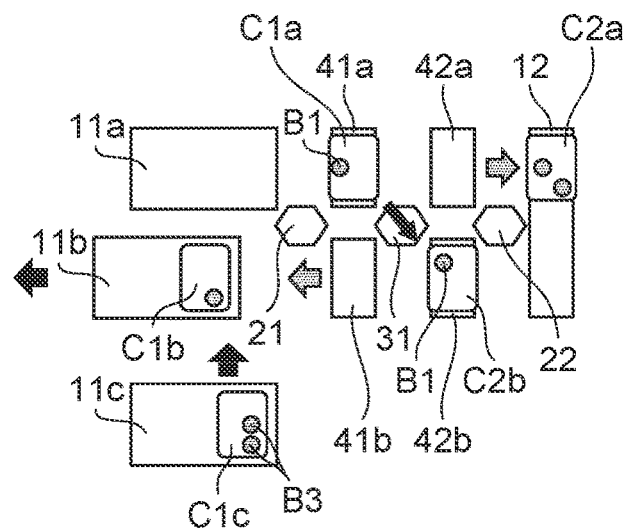
FIGS. 15A to 15D are schematic views for describing a rule related to the instruction.

As illustrated in FIG. 15A, the instruction device 90 transmits an instruction to the first transfer robot 21 to transfer the first container C1b to the first mobile robot 11b. Also, the instruction device 90 transmits an instruction to the second transfer robot 22 to transfer the second container C2a storing the articles B1 and B2 to the second mobile robot 12. The instruction device 90 transmits an instruction to the picking robot 31 to move the article B1 stored in the first container C1a to the second container C2b. The transfer of the first container C1b and the transfer of the second container C2a are performed in parallel with the picking of the article B2.

The instruction device 90 transmits an instruction to the first mobile robot 11b to transport the container group including the first container C1b out of the location at which the first loading platform 41b is installed. Also, the instruction device 90 transmits an instruction to the first mobile robot 11c to transport the container group including the first container C1c to the location at which the first loading platform 41b is installed. When the first mobile robot 11b has stored the first container C1b on the prescribed shelf, the instruction device 90 transmits an instruction to the first mobile robot 11b to transport the next container.

Figure 15B:
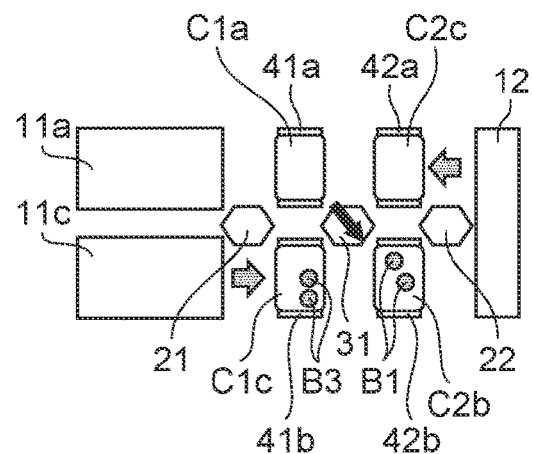

As illustrated in FIG. 15B, the instruction device 90 transmits an instruction to the picking robot 31 to move the article B1 stored in the first container C1a to the second container C2b. Also, the instruction device 90 transmits an instruction to the first transfer robot 21 to transfer the first container C1c to the first loading platform 41b. The instruction device 90 transmits an instruction to the second transfer robot 22 to transfer the second container C2c to the second loading platform 42a. The transfer of the first container C1c and the transfer of the second container C2c are performed in parallel with the picking of the article B1.

Figure 15C:
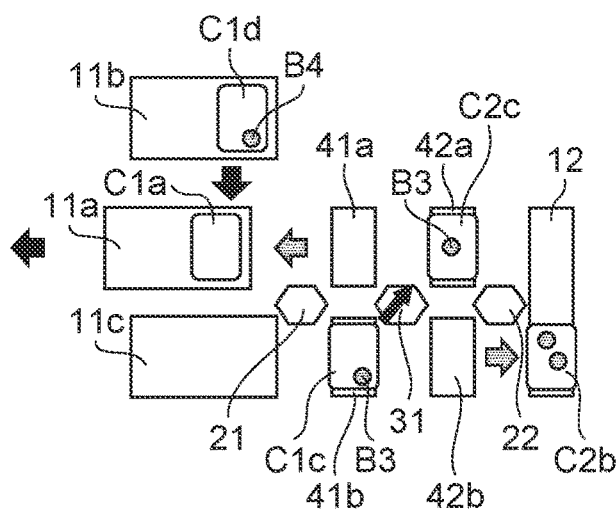

As illustrated in FIG. 15C, the instruction device 90 transmits an instruction to the picking robot 31 to move the article B3 stored in the first container C1c to the second container C2c. Also, the instruction device 90 transmits an instruction to the first transfer robot 21 to transfer the first container C1a to the first mobile robot 11a. The instruction device 90 transmits an instruction to the second transfer robot 22 to transfer the second container C2b storing two articles B1 to the second mobile robot 12. The transfer of the first container C1a and the transfer of the second container C2b are performed in parallel with the picking of the article B3.

The instruction device 90 transmits an instruction to the first mobile robot 11a to transport the container group including the first container C1a out of the location at which the first loading platform 41a is installed. Also, the instruction device 90 transmits an instruction to the first mobile robot 11b to transport the container group including the first container C1d to the location at which the first loading platform 41a is installed.

Figure 15D:
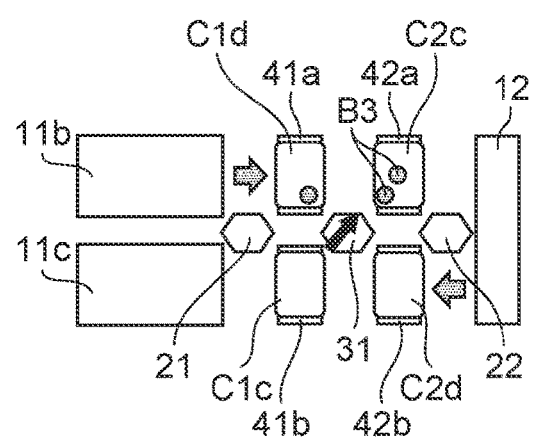

As illustrated in FIG. 15D, the instruction device 90 transmits an instruction to the picking robot 31 to move the article B3 stored in the first container C1c to the second container C2c. Also, the instruction device 90 transmits an instruction to the first transfer robot 21 to transfer the first container C1d to the first loading platform 41a. The instruction device 90 transmits an instruction to the second transfer robot 22 to transfer the second container C2d to the second loading platform 42b. The transfer of the first container C1d and the transfer of the second container C2d are performed in parallel with the picking of the article B3.

FIG. 16 is a timing chart showing the timing of the processes shown in FIGS. 14A to 14D and FIGS. 15A to 15D.

In FIG. 16, the columns show the elapsed time. The rows show the executed processing. The hatched cells show the times at which the robots are operating. The numbers recited in the cells show the numbers of the first container, the second container, and the article processed by the robots. According to the third rule, for example, from 30 seconds to 60 seconds, the multiple articles B1 from the first container C1a of the first loading platform 41a are picked to the second containers C2a and C2b, while at the first loading platform 41b, the picking of the article B2 from the first container C1b and the interchange with the first container C1c are performed. Thereby, the picking is performed at each timing from 30 seconds and beyond.

Thus, by applying the third rule, the standby time of the picking robot 31 due to the interchange of containers, etc., can be suppressed. For example, the transfer and picking processing can be performed without interruption. Normally, the interchange frequency of the first container increases when the quantity of the same article included in the order is less than the average. A problem is caused thereby, in that the standby time of the picking robot 31 is increased in order to interchange the first container at the location at which the picking robot 31 is installed. Conversely, according to the third rule, when a first container having a low article removal count is placed on one loading location of a first loading platform having not less than two container loading locations, a first container that has a large article removal count is transferred to the other loading location. The handling throughput can be improved by performing the transfer or picking of the first container loaded on the one loading location before, after, or simultaneously with the transfer or picking of the other first container loaded on the other loading location.

FIGS. 17A to 17D and FIGS. 18A to 18D are schematic views for describing a rule related to the instructions.

For example, there are cases where the number (a second number) of articles assigned to be moved to one second container placed on the second loading platform is low. According to the fourth rule, the instruction of the processing causes the selection of another second container having more articles than the second number assigned to be moved from the first container, and causes the other second container to be placed on the second loading platform. The fourth rule will now be described using FIGS. 17A to 18D.

The instruction device 90 refers to the article data and the order list. The instruction device 90 determines whether or not the number of articles included in the order is less than the average, or the number of articles included in the order that can be processed at a time is less than the average. The instruction device 90 may determine whether or not the number of articles included in the order or the number of articles included in the order that can be processed at a time is 1. When any of these numbers is determined to be less than the average, the instruction device 90 determines the processing sequence according to the fourth rule so that the order can be processed by performing parallel processing of another order having more articles that can be processed at a time than the order. Here, particularly when there are multiple options, the sequence is determined to make the average same-article quantity of the second container processed simultaneously or as a pair on the second loading platform 42 as uniform as possible. Here, the articles that can be processed at a time means the articles that can be picked while the second container is in a continuous state of being loaded on the work region of the second loading platform, etc.

Figure 17A:
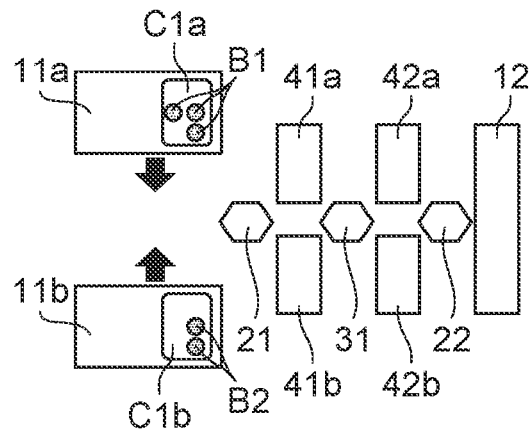
FIGS. 17A to 17D are schematic views for describing a rule related to the instruction.

As a result, for example, as illustrated in FIG. 17A, the first mobile robot 11a is instructed to transport the container group including the first container C1a. The first mobile robot 11b is instructed to transport the container group including the first container C1b. The first mobile robots 11a and 11b may transport shelves storing the container groups.

Figure 17B:
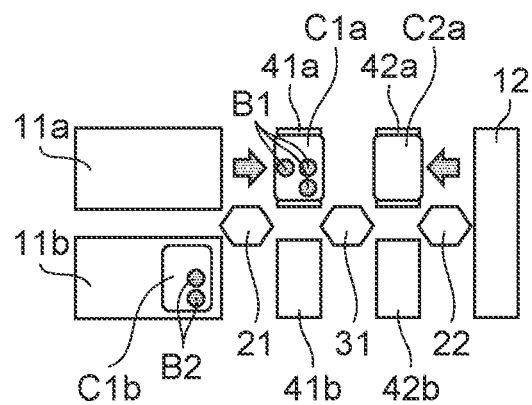

As illustrated in FIG. 17B, the instruction device 90 transmits an instruction to the first transfer robot 21 to transfer the first container C1a to the first loading platform 41a. The instruction device 90 transmits an instruction to the second transfer robot 22 to transfer the second container C2a to the second loading platform 42a. The transfer of the first container C1a and the transfer of the second container C2a are performed in parallel.

Figure 17C:
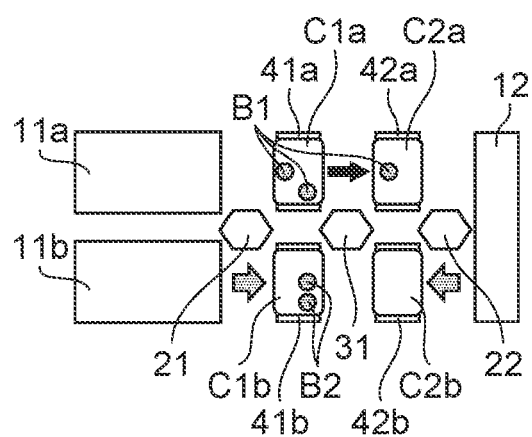

As illustrated in FIG. 17C, the instruction device 90 transmits an instruction to the picking robot 31 to move the article B1 stored in the first container C1a to the second container C2a. The instruction device 90 transmits an instruction to the first transfer robot 21 to transfer the first container C1b to the first loading platform 41b. The instruction device 90 transmits an instruction to the second transfer robot 22 to transfer the second container C2b to the second loading platform 42b. The transfer of the first container C1b and the transfer of the second container C2b are performed in parallel with the picking of the article B1. Here, multiple articles are included in the order associated with the second container C2a, whereas only the article B2 is included in the order associated with the second container C2b. In other words, the number of articles included in the order associated with the second container C2a is greater than the average same-article quantity. The number of articles included in the order associated with the second container C2b is 1, and is less than the average same-article quantity.

Figure 17D:
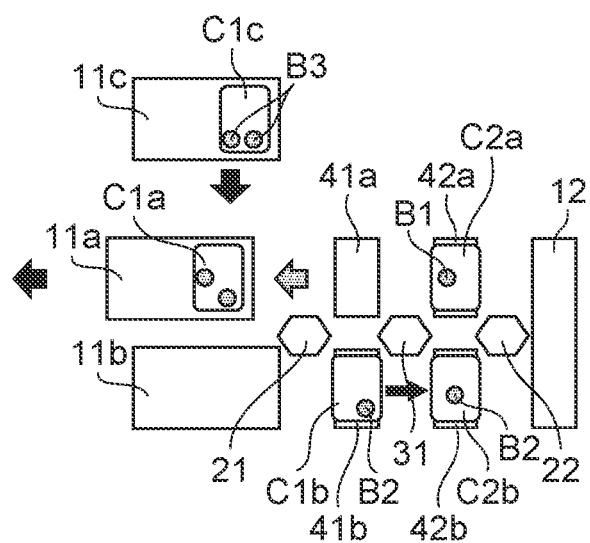

As illustrated in FIG. 17D, the instruction device 90 transmits an instruction to the picking robot 31 to move the article B2 stored in the first container C1b to the second container C2b. Also, the instruction device 90 transmits an instruction to the first transfer robot 21 to transfer the first container C1a to the first mobile robot 11a. The transfer of the first container C1a is performed in parallel with the picking of the article B2.

The instruction device 90 transmits an instruction to the first mobile robot 11a to transport the container group including the first container C1a out of the location at which the first loading platform 41a is installed. Also, the instruction device 90 transmits an instruction to the first mobile robot 11c to transport the container group including the first container C1c to the location at which the first loading platform 41a is installed.

Figure 18A:
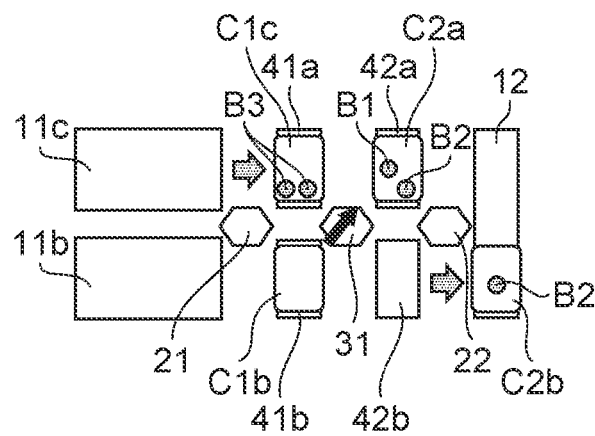
FIGS. 18A to 18D are schematic views for describing a rule related to the instruction.

As illustrated in FIG. 18A, the instruction device 90 transmits an instruction to the first transfer robot 21 to transfer the first container C1c to the first loading platform 41a. Also, the instruction device 90 transmits an instruction to the second transfer robot 22 to transfer the second container C2b storing the article B2 to the second mobile robot 12. The instruction device 90 transmits an instruction to the picking robot 31 to move the article B2 stored in the first container C1b to the second container C2a. The transfer of the first container C1c and the transfer of the second container C2b are performed in parallel with the picking of the article B2.

Figure 18B:
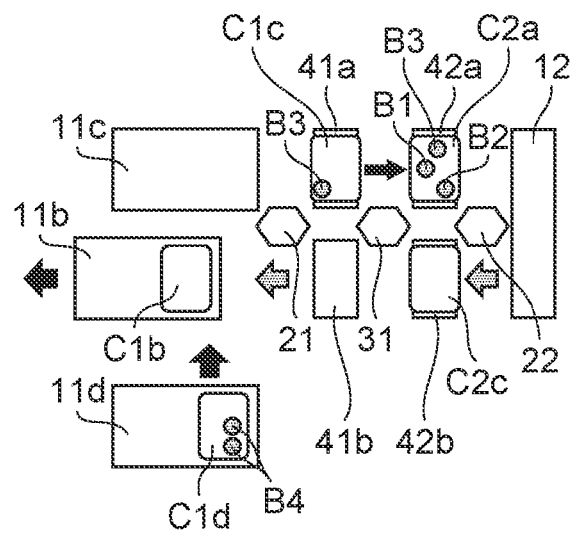

As illustrated in FIG. 18B, the instruction device 90 transmits an instruction to the picking robot 31 to move the article B3 stored in the first container C1c to the second container C2a. Also, the instruction device 90 transmits an instruction to the first transfer robot 21 to transfer the first container C1b to the first mobile robot 11b. The instruction device 90 transmits an instruction to the second transfer robot 22 to transfer the second container C2c to the second loading platform 42b. The transfer of the first container C1b and the transfer of the second container C2c are performed in parallel with the picking of the article B3.

The instruction device 90 transmits an instruction to the first mobile robot 11b to transport the container group including the first container C1b out of the location at which the first loading platform 41b is installed. Also, the instruction device 90 transmits an instruction to a first mobile robot 11d to transport the container group including the first container C1d to the location at which the first loading platform 41b is installed.

Figure 18C:
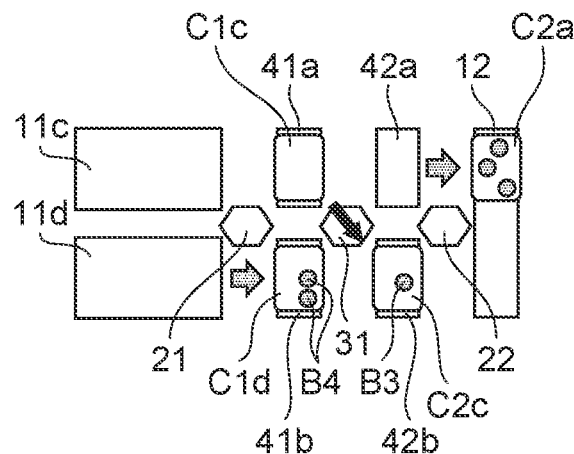

As illustrated in FIG. 18C, the instruction device 90 transmits an instruction to the picking robot 31 to move the article B3 stored in the first container C1c to the second container C2c. Also, the instruction device 90 transmits an instruction to the first transfer robot 21 to transfer the first container C1d to the first loading platform 41b. The instruction device 90 transmits an instruction to the second transfer robot 22 to transfer the second container C2a storing the articles B1, B2, and B3 to the second mobile robot 12. The transfer of the first container C1d and the transfer of the second container C2a are performed in parallel with the picking of the article B3.

Figure 18D:
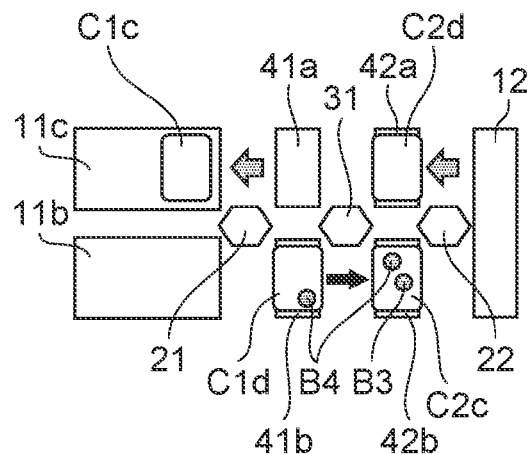

As illustrated in FIG. 18D, the instruction device 90 transmits an instruction to the picking robot 31 to move the article B4 stored in the first container C1d to the second container C2c. Also, the instruction device 90 transmits an instruction to the first transfer robot 21 to transfer the first container C1c to the first mobile robot 11c. The instruction device 90 transmits an instruction to the second transfer robot 22 to transfer the second container C2d to the second loading platform 42b. The transfer of the first container C1c and the transfer of the second container C2d are performed in parallel with the picking of the article B4.

FIG. 19 is a timing chart showing the timing of the processes shown in FIGS. 17A to 17D and FIGS. 18A to 18D.

In FIG. 19, the columns show the elapsed time. The rows show the executed processing. The hatched cells are the times at which the robots are operating, and the numbers recited in the cells show the numbers of the first container, the second container, and the article processed by the robots. According to the fourth rule, for example, from 30 seconds to 60 seconds, the articles B1 to B3 are picked to the second container C2a of the second loading platform 42a, while at the second loading platform 42b, the picking of the article B2 to the second container C2b and the interchange of the second container C2c are performed. Thereby, the picking is performed at each timing from 30 seconds and beyond.

Thus, by applying the fourth rule, the standby time due to the interchange of containers, etc., can be suppressed. For example, the transfer and picking processing can be performed without interruption. Normally, the interchange frequency of the second container increases when the number of articles included in the order that can be processed at a time is low, such as when the number of articles included in the order is one, etc. A problem is caused in that the standby time of the picking robot 31 increases as the interchange of containers increases. Conversely, according to the fourth rule, when a second container that has a low article picking count is placed on one loading location of a second loading platform having not less than two loading locations, another second container having a high article picking count is transferred to the other loading location. The handling throughput can be improved by performing the transfer or picking of the second container loaded on the one loading location before, after, or simultaneously with the transfer or picking of the other second container loaded on the other loading location.

FIGS. 20A to 20D and FIGS. 21A to 21D are schematic views for describing rules related to the instructions.

In the example shown in FIGS. 20A to 20D and FIGS. 21A to 21D, the handling system 1 further includes an exchange mechanism 50, a shipping mechanism 51a, and a shipping mechanism 51b. The exchange mechanism 50 interchanges the second containers. In the interchange, the second container C2 is transferred between the exchange mechanism 50 and the second loading platform 42. The shipping mechanisms 51a and 51b ship the second containers C2 storing the articles. The exchange mechanism 250 of the transfer robot 230 shown in FIGS. 6A and 6B can be used as the exchange mechanism 50. The shipping mechanism 251 of the transfer robot 230 can be used as the shipping mechanisms 51a and 51b.

The exchange mechanism 50 interchanges the second container according to the processing conditions of the order. When there are many types of articles in the order associated with one second container, there are cases where the picking of all of the articles included in the order will not be completed in one processing with the second container placed on the second loading platform 42. In such a case, the second container that stores a portion of the multiple articles included in the order is transferred from the second loading platform 42 back to the exchange mechanism 50. Meanwhile, picking to another second container is performed at the second loading platform. Subsequently, the second container that is held by the exchange mechanism 50 is returned to the second loading platform at the timing when a first container storing an article associated with the second container is transported to the installation location of the first loading platform. The picking of the remaining articles of the order to the returned second container is restarted. The mechanism that performs such an interchange of the second container is the exchange mechanism 50. The shipping mechanism 51a or 51b transports and ships the second container for which the picking of all of the articles included in the order is completed.

FIGS. 20A to 20D and FIGS. 21A to 21D are schematic views for describing rules related to the instructions.

According to the fifth rule, the instruction of the processing causes the first mobile robot 11 to simultaneously transport multiple first containers associated with an order capable of being consecutively processed. According to the sixth rule, the instruction device 90 determines whether or not the interchange interval of one second container by the exchange mechanism 50 is short compared to the average interchange interval of the entire order list. The instruction of the processing according to the sixth rule causes the selection of a second container for which shipping processing will be performed for the other of the second loading platform when the interchange interval of the second container on one of the second loading platforms is less than the average. The fifth and sixth rules will now be described using FIGS. 20A to 21D.

Figure 20A:
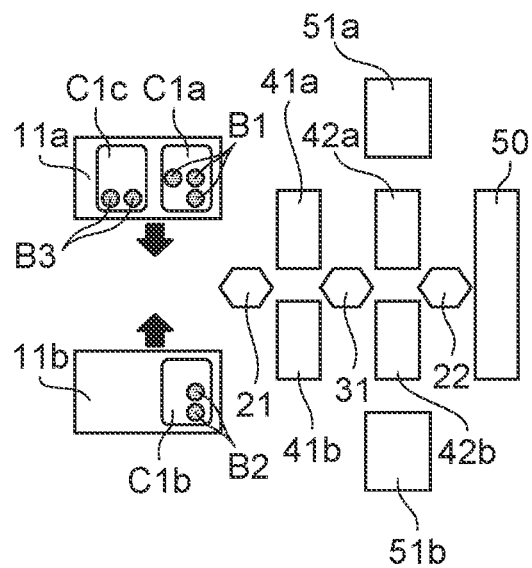
FIGS. 20A to 20D are schematic views for describing rules related to the instruction.

The instruction device 90 refers to the article data and the order list. According to the fifth rule, the instruction device 90 simultaneously moves multiple first containers that can be consecutively processed. According to the sixth rule, a second container that has a short container interchange interval is assigned to be processed following a second container for which shipping processing is to be performed. As a result, for example, as illustrated in FIG. 20A, the multiple first mobile robots 11a and 11b are instructed to transport the multiple first containers C1a to C1c. Here, the first mobile robot 11a simultaneously transports the first container C1a and the first container C1c.

Figure 20B:
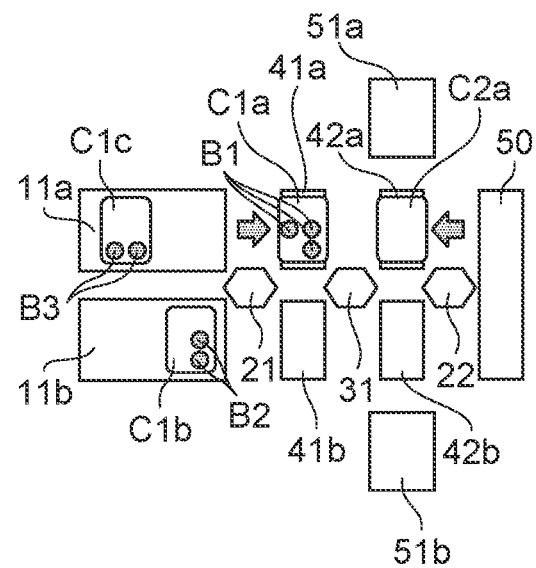

As illustrated in FIG. 20B, the instruction device 90 transmits an instruction to the first transfer robot 21 to transfer the first container C1a to the first loading platform 41a. The instruction device 90 transmits an instruction to the second transfer robot 22 to transfer one second container C2a to the second loading platform 42a.

Figure 20C:
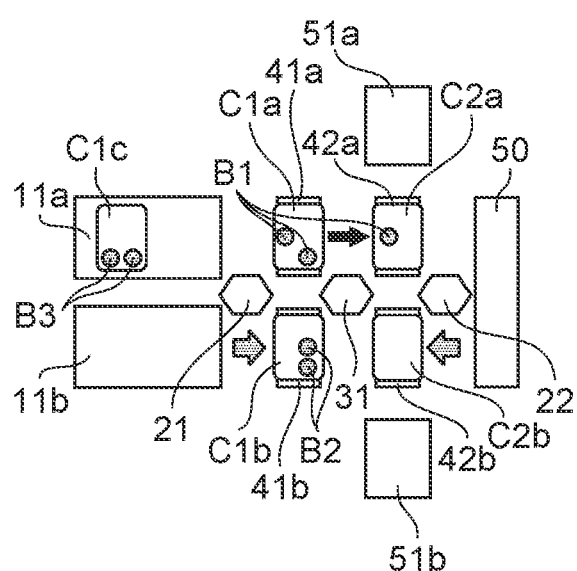

As illustrated in FIG. 20C, the instruction device 90 transmits an instruction to the picking robot 31 to move the article B1 stored in the first container C1a to the second container C2a. The transfer of the first container C1b and the transfer of the second container C2b are performed in parallel with the picking of the article B1.

Figure 20D:
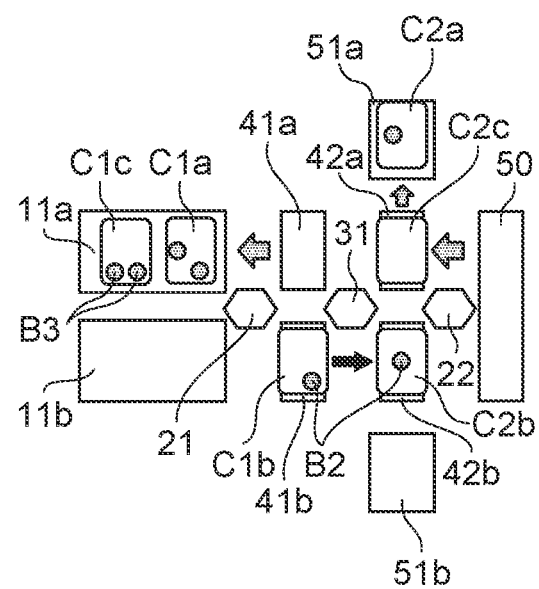

As illustrated in FIG. 20D, the instruction device 90 transmits an instruction to the picking robot 31 to move the article B2 stored in the first container C1b to the second container C2b. Also, the instruction device 90 transmits an instruction to the first transfer robot 21 to transfer the first container C1a to the first mobile robot 11a. An instruction is transmitted to the shipping mechanism 51a to transport the second container C2a out. Additionally, an instruction is transmitted to the second transfer robot 22 to transfer the second container C2c to the second loading platform 42b. The transfer of the first container C1a, the second container C2a, and the second container C2c is performed in parallel with the picking of the article B2.

Figure 21A:
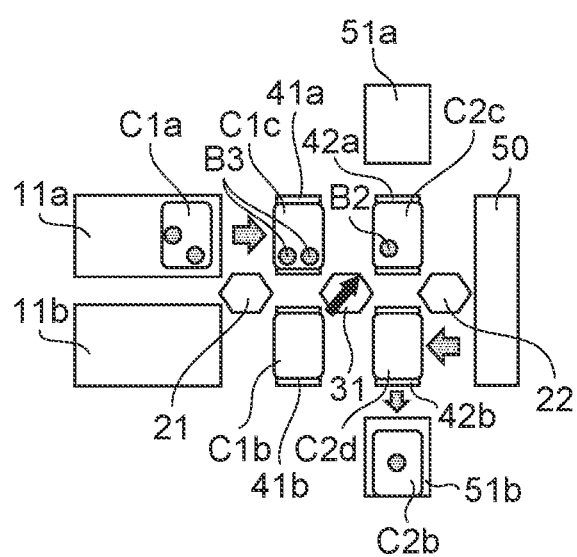
FIGS. 21A to 21D are schematic views for describing rules related to the instruction.

As illustrated in FIG. 21A, the instruction device 90 transmits an instruction to the first transfer robot 21 to transfer the first container C1c to the first loading platform 41a. Also, the instruction device 90 transmits an instruction to the shipping mechanism 51b to transport the second container C2b storing the article B2 out. An instruction is transmitted to the second transfer robot 22 to transfer the second container C2d to the second loading platform 42b. Also, the instruction device 90 transmits an instruction to the picking robot 31 to move the article B2 stored in the first container C1b to the second container C2a. The transfer of the first container C1c, the second container C2b, and the transfer of the second container C2d are performed in parallel with the picking of the article B2. Thus, the number of movements of the mobile robots can be reduced. A cost reduction of the system is possible because a few mobile robots can keep up with the system. Also, by simultaneously shipping a second container for which the order is completed and transferring a second container for which the order is not completed to the loading platform, the degree of parallelism of the processing is increased, and the throughput is improved.

Figure 21B:
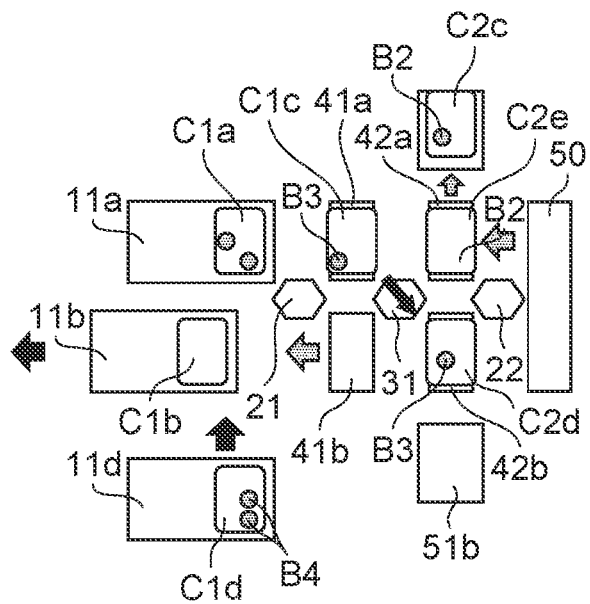

As illustrated in FIG. 21B, the instruction device 90 transmits an instruction to the picking robot 31 to move the article B3 stored in the first container C1c to the second container C2d. Also, the instruction device 90 transmits an instruction to the first transfer robot 21 to transfer the first container C1b to the first mobile robot 11b. The instruction device 90 transmits an instruction to the shipping mechanism 51a to transport the second container C2c out. An instruction is transmitted to the second transfer robot 22 to transfer a second container C2e to the second loading platform 42a. The transfer of the first container C1b, the second container C2c, and the second container C2e is performed in parallel with the picking of the article B3.

Figure 21C:
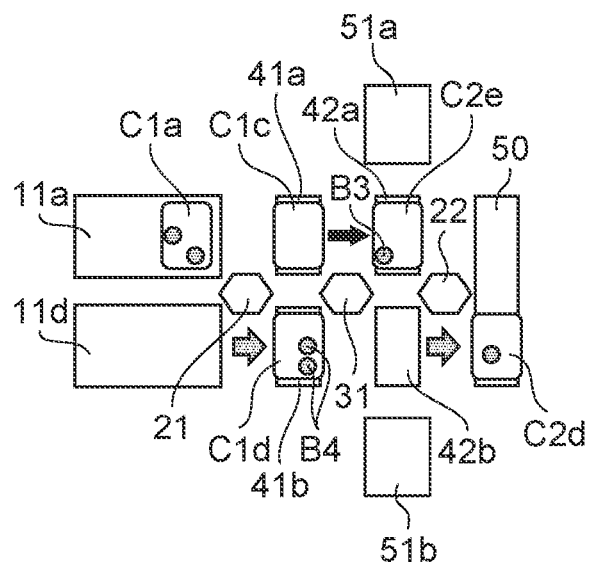

As illustrated in FIG. 21C, the instruction device 90 transmits an instruction to the picking robot 31 to move the article B3 stored in the first container C1c to the second container C2e. Also, the instruction device 90 transmits an instruction to the first transfer robot 21 to transfer the first container C1d to the first loading platform 41b. The instruction device 90 transmits an instruction to the second transfer robot 22 to transfer the second container C2d storing the article B3 to the exchange mechanism 50. The transfer of the first container C1*d* and the transfer of the second container C2*d* are performed in parallel with the picking of the article B3.

Figure 21D:
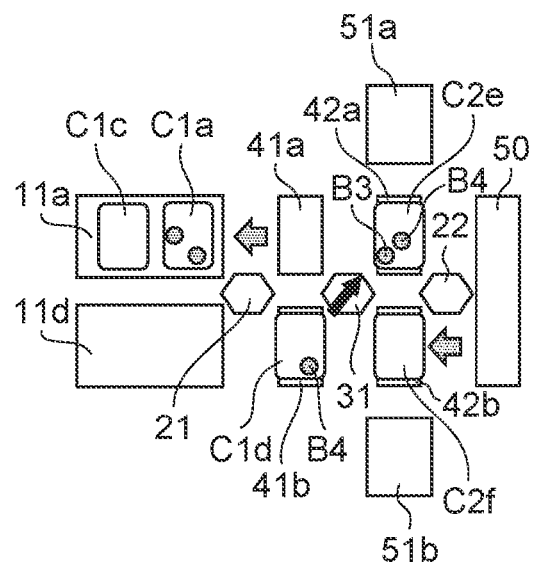

As illustrated in FIG. 21D, the instruction device 90 transmits an instruction to the picking robot 31 to move the article B4 stored in the first container C1*d* to the second container C2*e*. Also, the instruction device 90 transmits an instruction to the first transfer robot 21 to transfer the first container C1*c* to the first mobile robot 11*c*. The instruction device 90 transmits an instruction to the second transfer robot 22 to transfer a second container C2*f* to the second loading platform 42*b*. The transfer of the first container C1*c* and the transfer of the second container C2*f* are performed in parallel with the picking of the article B4.

FIG. 22 is a timing chart showing the timing of the processes shown in FIGS. 20A to 20D and FIGS. 21A to 21D.

In FIG. 22, the columns show the elapsed time. The rows show the executed processing. The hatched cells are the times at which the robots are operating, and the numbers recited in the cells show the numbers of the first container, the second container, and the article processed by the robots.

Thus, by applying the fifth and sixth rules, the call count of the first mobile robot can be reduced, and the standby time due to the interchange of containers, etc., can be suppressed. For example, the transfer and/or picking processing can be performed without interruption. Normally, when the number of the first mobile robots 11 is small with respect to the number of orders, the first mobile robots cannot keep up with the calls; and standby time occurs. Also, when the interchange frequency of the second container is high, the processing of the exchange mechanism 50 takes time, which undesirably increases the standby time of the other robots. Conversely, according to the fifth rule, multiple first containers associated with an order capable of being consecutively processed are simultaneously transported. Also, according to the sixth rule, when a second container has a short interchange interval, the processing is performed by transferring a second container for which shipping processing will be performed to the other of the second loading platform. As a result, the throughput of the article sorting can be improved.

FIG. 23 is a timing chart when the fifth rule and the sixth rule are not applied.

In FIG. 23, the columns show the elapsed time. The rows show the executed processing. The hatched cells are the times at which the robots are operating, and the numbers recited in the cells show the numbers of the first container, the second container, and the article processed by the robots. In the flowchart illustrated in FIG. 22, picking is performed at each time from 30 seconds to 80 seconds, whereas in the flowchart illustrated in FIG. 23, the picking robot 31 is standing by at 50 seconds and 70 seconds. Thus, it can be seen that when the rules are not applied, much standby time of the picking robot occurs, and the article processing count per unit time, i.e., the throughput, is reduced.

Examples

FIG. 24 is a schematic view showing a specific example of the handling system according to the embodiment.

In FIG. 24, multiple shelves A are placed in each storage area. According to a command from the instruction device 90, the first mobile robot 11 transports one of the shelves A to the designated workstation. The workstations include multiple workstations WS1 at which workers W work, and multiple workstations WS2 at which robots work. In the workstation WS2 at which the robots work, the first transfer robot 21 transfers the first container C1 from the transported shelf A to the first loading platform 41 which is a part of the first transfer robot 21. In the workstation WS2, the second transfer robot 22 transfers the second container C2 from the exchange mechanism 50, which is a part of the second transfer robot 22, to the second loading platform 42. The picking robot 31 picks an article from the first container C1 placed on the first loading platform 41 to the second container C2 placed on the second loading platform 42. The second container C2 for which the picking is completed is transferred to a shipping mechanism 51 and is transported to a pickup point by the second mobile robot 12.

According to the example, the transfer robot 220 shown in FIGS. 5A and 5B is used as the first transfer robot 21. The transfer robot 230 shown in FIGS. 6A and 6B is used as the second transfer robot 22. The shipping mechanism 251 and the exchange mechanism 250 of the transfer robot 230 are respectively used as the shipping mechanism 51 and the exchange mechanism 50.

Figure 25:
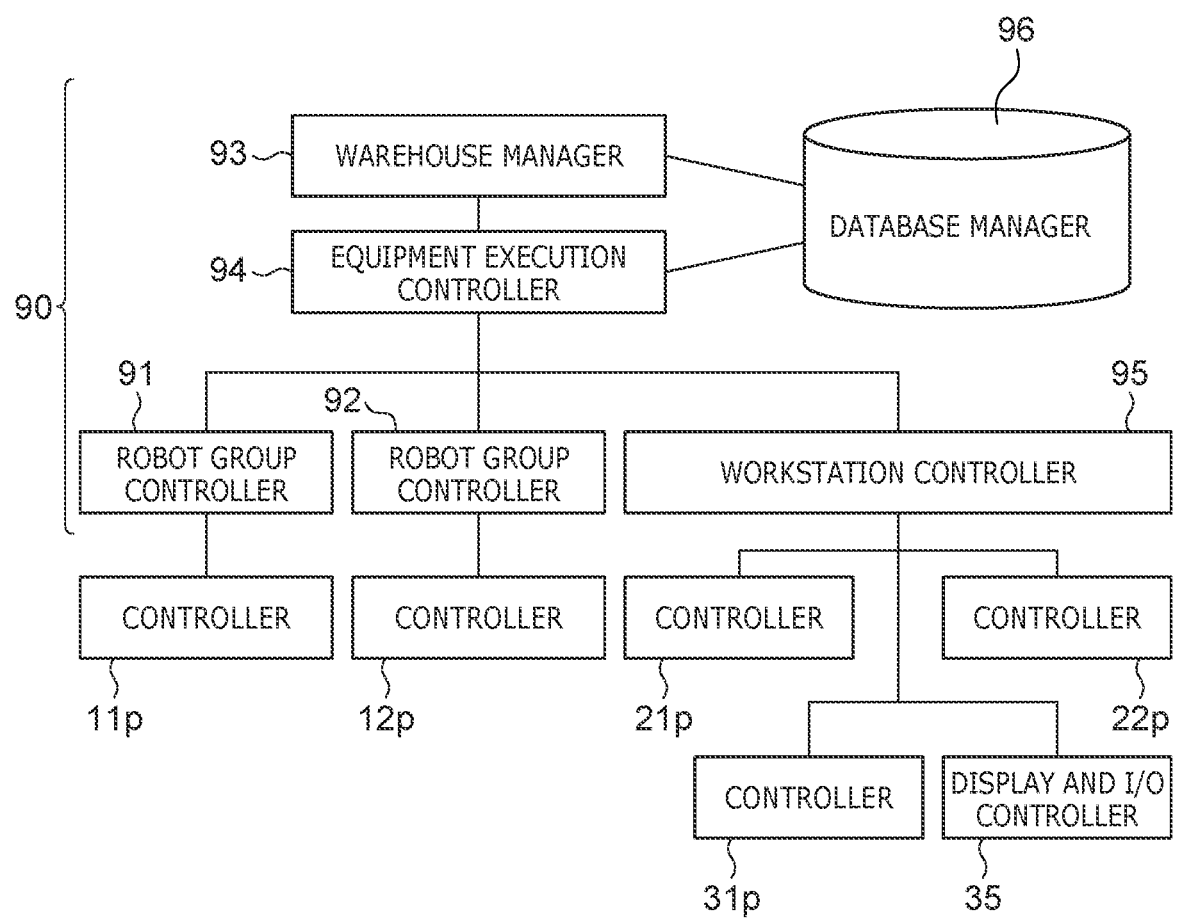
FIG. 25 is a schematic view showing a specific configuration of the instruction device of the handling system according to the example.

FIG. 25 is a schematic view showing a specific configuration of the instruction device of the handling system according to the example.

The instruction device 90 includes a robot group controller 91, a robot group controller 92, a warehouse manager 93, an equipment execution controller 94, a workstation controller 95, and a database manager 96. A controller 11*p* controls the first mobile robot 11. The robot group controller 91 is connected with the controllers 11*p* and controls the multiple first mobile robots 11. A controller 12*p* controls the second mobile robot 12. The robot group controller 92 is connected with the controllers 12*p* and controls the multiple second mobile robots 12. The warehouse manager 93 integrates and manages the inventory status of articles in the warehouse, the processing of orders, etc. The equipment execution controller 94 controls multiple pieces of equipment inside the warehouse and enables the equipment to operate with cooperation. The workstation controller 95 controls the equipment of the workstations. The workstation controller 95 is connected with a controller 21*p* controlling the first transfer robot 21, a controller 22*p* controlling the second transfer robot 22, and a controller 31*p* controlling the picking robot 31. Thereby, the workstation controller 95 controls the equipment installed in the workstation. The workstation controller 95 also is connected with a display and an I/O controller 35. The display and the I/O controller 35 perform information transmission with the terminal device of a worker, equipment control of safety systems, etc. The database manager 96 manages data such as order management data, article management data, shelf management data, equipment data, operational status data, etc.

Figure 26:
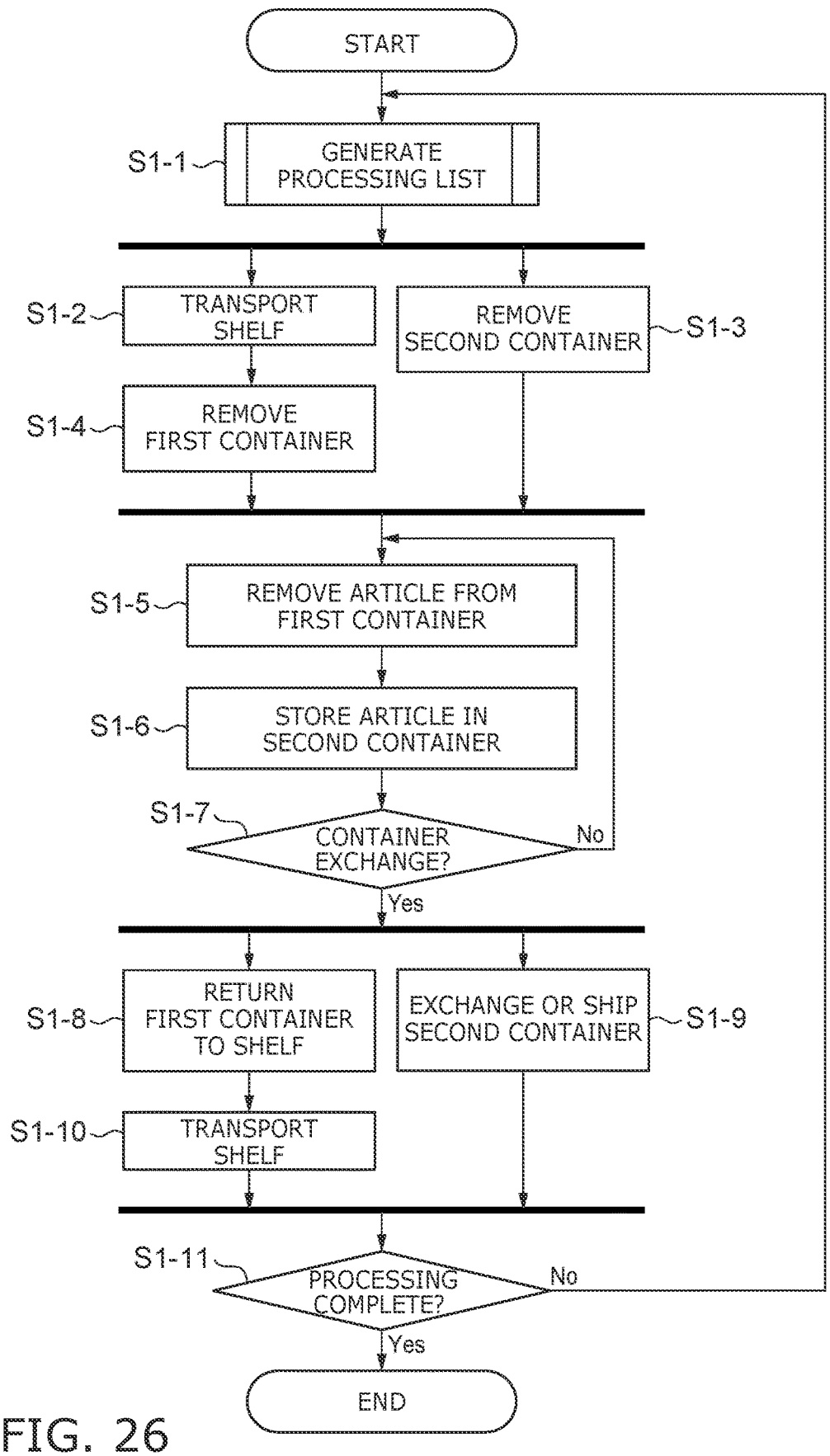
FIG. 26 is a flowchart showing processing according to the handling system according to the example.

FIG. 26 is a flowchart showing processing according to the handling system according to the example.

The handling system 1 starts handling in response to an external order. In a first step S1-1, the instruction device 90 generates a processing list of the articles based on the order and information of the database. The information of the referenced database is the article management data D1 as well as the shelf management data S1, functional data of various robots, operational status data of various robots, etc. In a second step S1-2, the first mobile robot 11 transports the designated shelf to the workstation WS2 according to the instruction of the instruction device 90. In a third step S1-3, the second container C2 that is designated by the instruction device 90 is removed from the storage part of the exchange mechanism 50 onto the second loading platform 42 by the second transfer robot 22. At this time, a second container to which an ID has already been assigned may be removed. An empty second container may be removed and numbered with a label and the like, or a new ID for processing may be assigned to an existing number.

In a fourth step S1-4, the designated first container C1 is removed from the shelf A transported by the first mobile robot 11 onto the first loading platform 41 by the first transfer robot 21. In a fifth step S1-5, the picking robot 31 removes the designated article from the designated first container C1 loaded on the first loading platform 41. In a sixth step S1-6, the picking robot 31 stores the removed article in the designated second container C2. In a seventh step S1-7, the instruction device 90 determines whether or not the picking of the articles from the first container C1 of the first loading platform 41 to the second container C2 of the second loading platform 42 is complete. When pickable articles exist, the flow proceeds to the fifth step S1-5. If the picking of the articles is complete, the flow proceeds to an eighth step S1-8.

In the eighth step S1-8, the first transfer robot 21 transfers the first container C1 from the first loading platform 41 to the shelf A. In a ninth step S1-9, the second transfer robot 22 exchanges the second container C2 of the second loading platform 42 or uses the shipping mechanism 51 to ship the second container C2. In a tenth step S1-10, the first mobile robot 11 transports the shelf A to which the first container C1 was returned to the prescribed shelf installation position or other workstation according to the instruction of the instruction device 90. In an eleventh step S1-11, the instruction device 90 determines whether or not all of the processing is complete. The processing ends when all of the processing is determined to be complete. When processing remains, the flow proceeds to the first step S1-1, and the processing is repeated.

Figure 27:
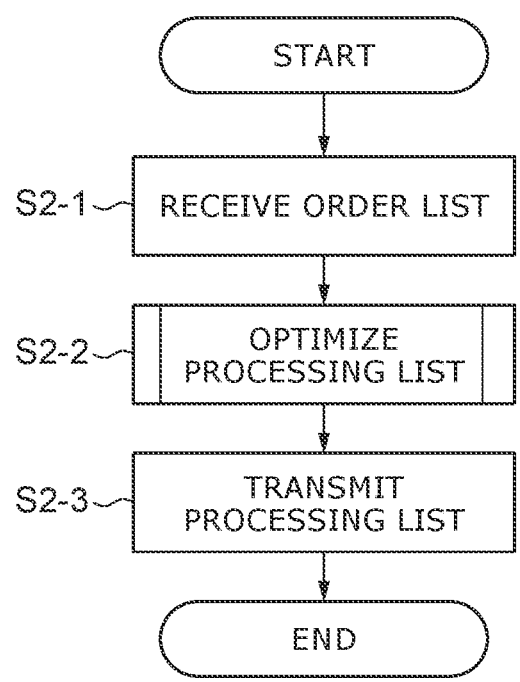
FIG. 27 is a flowchart showing a method for generating a processing list.

FIG. 27 is a flowchart showing a method for generating the processing list.

When generating the processing list, the instruction device 90 receives an order list from a higher-level system or external system in a first step S2-1. In a second step S2-2, a processing list for sorting the articles according to the order is generated based on the order list and data stored in the database. The referenced data is the article management data, the shelf management data, etc. At this time, the instruction device 90 optimizes the batch division, sequence, and the like of the processing list based on the equipment data, the operational status data, etc. Here, a batch is a data set of sequential data that is of a certain amount or is collected over a certain period. The optimized processing list is transmitted in a third step S2-3, and the processing list generation ends.

Figure 28:
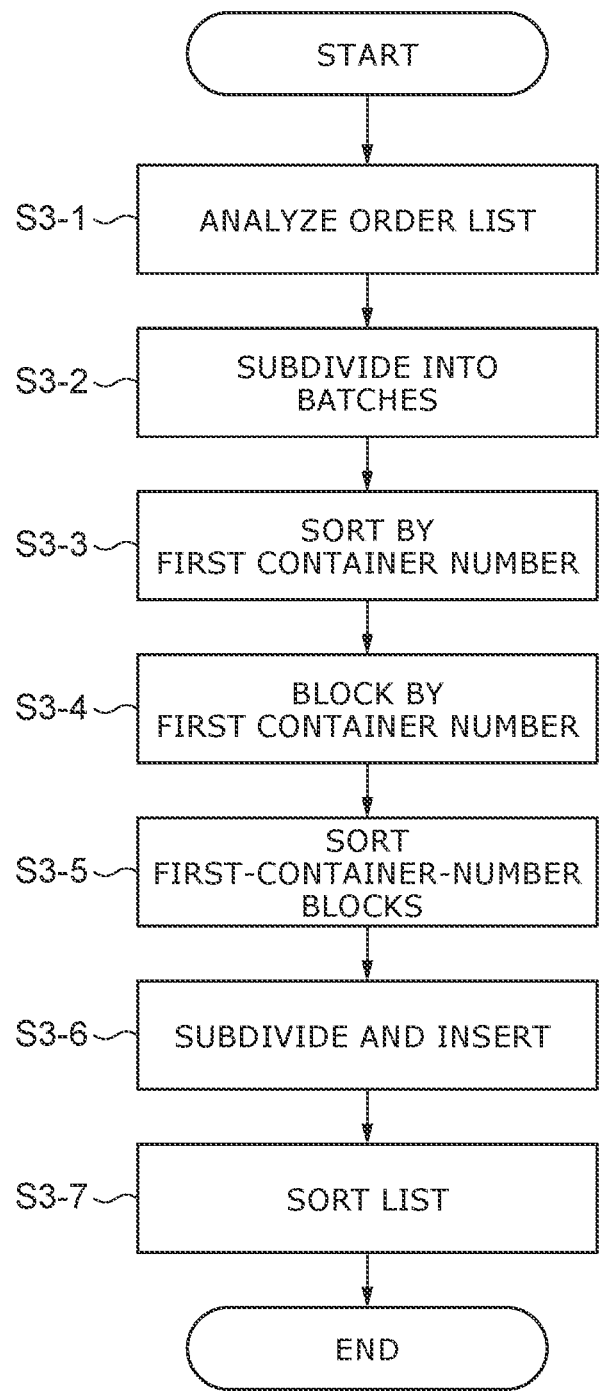
FIG. 28 is a flowchart showing a method for optimizing the processing list.

FIG. 28 is a flowchart showing a method for optimizing the processing list.

In a first step S3-1, the instruction device 90 analyzes the received order list and associates the order included in the order list with the article management data and the shelf management data. In a second step S3-2, the instruction device 90 subdivides the associated list into batches by time frame such as morning, afternoon, etc., based on the shipping information. The instruction device 90 further subdivides the list into batches by workstation. At this time, the same article and the same container are set to be processed at the same location as much as possible, and fragile articles are assigned to specific workstations. In a third step S3-3, the instruction device 90 sorts the list subdivided into batches by first container number. In a fourth step S3-4, the sorted list is blocked by container ID. In a fifth step S3-5, the blocks of each first container number are analyzed and sorted within each block.

The sorting is performed according to the following rules. First, the initial block is determined. Second, a block that includes the same second container number as a second container number of the list of the initial block is selected as the second block. The second container number that is included in both the initial and second blocks is used as a base (key) to associate the initial and second blocks. Third, when selecting the next block, a second container number to be used as a new key is selected from among second container numbers not used as a base (key) in the association of the previous blocks; and the next block is associated with the second block by using the new key. Fourth, when there are multiple options, blocks that include multiple occurrences of the same second container are preferentially selected; and blocks having a high second container interchange count or blocks having few (e.g., one) second container are given lower priority order. Fifth, blocks that have high second container interchange counts are included in consecutive processing pairs by being arranged directly after blocks for which the same second container can be consecutively processed multiple times. Sixth, small blocks are included in consecutive processing pairs by being arranged directly after large blocks. When there are multiple options at this time, blocks that include the same second container number are preferentially set in pairs. In a sixth step S3-6, large blocks are subdivided, and small blocks are inserted between the subdivided blocks. In a seventh step S3-7, the processing sequences inside the blocks are sorted so that the same second container number can be consecutively processed between the blocks. The processing described above completes the optimization processing of the processing list.

Although a ruled-based optimization technique is used in the example, the list optimization may be performed by optimization as a mathematical programming problem to satisfy the first to sixth rules, or optimization using a machine learning technique.

FIGS. 29A to 36 are data for describing a specific example of optimization.

The optimization flow of FIG. 28 will now be described using FIGS. 29A to 36. FIG. 29A shows an example of an order list. FIG. 29B shows excerpt information of article data and shelf management data extracted from the database. In the first step S3-1, the list of FIG. 30 is generated by associating the order list with the article data and the management data. Here, the instruction device 90 determines whether or not the same type of article is stored in multiple locations. For example, the article "YYYY001" is extracted. The instruction device 90 refers to the shelf ID and the like of this article and preferentially selects other articles, if any, that use the same shelf. In this case, the article "YYYY002" also is stored in the shelf ID "AAA002". The instruction device 90 decides to transfer the article "YYYY001" from the shelf of the shelf ID "AAA002". The instruction device 90 further analyzes the information and decides to process the order "XXX0003", which has appurtenant information indicating handle with care (fragile), in a batch other than the order number "XXX0001" that includes the article "YYYY001". Also, the instruction device 90 decides to process the order "XXX0007" having the afternoon shipment "MAR06PM" designation and the order "XXX0008" having products stored on another floor "2F" in batches other than "XXX0001" and "XXX0003".

In the second step S3-2, the instruction device 90 extracts the list as batches based on the analysis results. Then, the instruction device 90 refers to the operational status data and the equipment database and determines workstations usable for the processing. FIG. 31 shows one extracted batch list. FIGS. 32 and 33 show lists in which the portions necessary for the following processing are extracted from the data of FIG. 31. The list of FIG. 32 shows an extracted list. FIG. 33 is a list in which data from the list shown in FIG. 32 is extracted and converted. In the conversion, the shelf ID and the sub-shelf ID are combined and converted into the first container number. The order number and the sub-number are combined and integrated into the second container number.

In the third step S3-3, the instruction device 90 sorts the list by the first container number. In the fourth step S3-4, the instruction device 90 uses the first container number to make blocks. FIG. 34A shows the blocking results. In the fifth step S3-5, the instruction device 90 sorts the blocks based on the rules. For example, the instruction device 90 determines the next block based on the second container number "XXX000101" of the block "AAA0025". The blocks that can be associated with the block "AAA0025" are the block "AAA0028", the block "AAA0050", and the block "AAA0065". Among these blocks, the block "AAA0065" includes one second container. The interchange count of the second container of the block "AAA0050" is 2 times. This is more than the one interchange of the block "AAA0028" and more than zero interchanges of the block "AAA065". Therefore, the block "AAA0028" is selected as the next block.

Then, the instruction device 90 refers to the block "AAA0028". In the block "AAA0028", the second container number "XXX000201" is not used in an association. The instruction device 90 determines the next block based on the second container number "XXX000201". Here, the block "AAA0050" that includes many second containers "XXX000201" is selected. Thus, the sequence is determined based on the rules. FIG. 34B shows the determination results. The instruction device 90 also sets the block "AAA0065" having one second container to be in a pair with the block "AAA0050" having many second containers. FIG. 35A is a list showing the results.

In the sixth step S3-6, the instruction device 90 subdivides the large block "AAA0050", and inserts the small block "AAA0065". In the seventh step S3-7, the instruction device 90 sorts the lists inside the blocks so that the second container numbers are consecutive between the blocks. FIG. 35B shows the sorted results. The list satisfies the first to sixth rules.

For example, the articles "YYYY001" and "YYYY002" respectively from the first containers "AAA0025" and "AAA0028" placed on the first loading platform are picked to the second container "XXX000101". These instructions are based on the first rule.

The articles "YYYY001" from the first container "AAA0025" are respectively picked to the second containers "XXX000401" and "XXX000101" placed on the second loading platform. These instructions are based on the second rule.

The picking from the first container "AAA0065" is performed in parallel with the picking from the first container "AAA0050". The number of articles picked from the first container "AAA0065" is 1. The number of articles picked from the first container "AAA0050" is 4. These instructions are based on the third rule.

When the first container "AAA0038" is loaded on the first loading platform, the number of articles picked to the second container "XXX000501" is 1. On the other hand, more articles, i.e., three articles, are picked from the first containers "AAA0038" and "AAA0047" to the second container "XXX000401". These instructions are based on the fourth rule.

The first containers "AAA0025" and "AAA0028" both are stored in the same shelf having the shelf ID "AAA002". The first mobile robot 11 simultaneously transports the first containers "AAA0025" and "AAA0028" associated with an order capable of being consecutively processed by transporting the shelf "AAA002". The instruction is based on the fifth rule.

Articles respectively from the first containers "AAA0096", "AAA0038", "AAA0047", and "AAA0073" are picked to the second container "XXX000501". Compared to the other second containers, the second container "XXX000501" has a high interchange count to the second loading platform. When articles are picked to the second container "XXX000501", second containers such as "XXX000201", "XXX000401", "XXX000601", etc., are shipped. These instructions are based on the sixth rule.

Efficient handling can be realized by the instructions generated according to the first to sixth rules.

FIG. 36 shows the processing flow when the list of FIG. 35B is used. In FIG. 36, ">>" shows the operation of the first transfer robot 21 removing the designated first container from the shelf. "<<" shows the operation of the first transfer robot 21 returning the designated first container to the shelf. In each cell of the first transfer robot in each processing time, the upper row inside the bold box is the first loading platform 41a. The lower row is the first loading platform 41b. ">" shows the operation of the second transfer robot 22 removing the designated second container from the exchange mechanism 50. "<" shows the operation of the second transfer robot 22 returning the designated second container to the exchange mechanism 50. In the cells of the second transfer robot in each processing time, the upper row inside the bold box is the second loading platform 42a. The lower row is the second loading platform 42b. "↓" shows the operation of using the shipping mechanism to ship the second container. "Pick→" shows the operation of moving the article from the first container of the first loading platform to the second container of the second loading platform. It can be seen from FIG. 36 that the picking robot can operate substantially without standby, and highly efficient handling can be realized.

Figure 37:
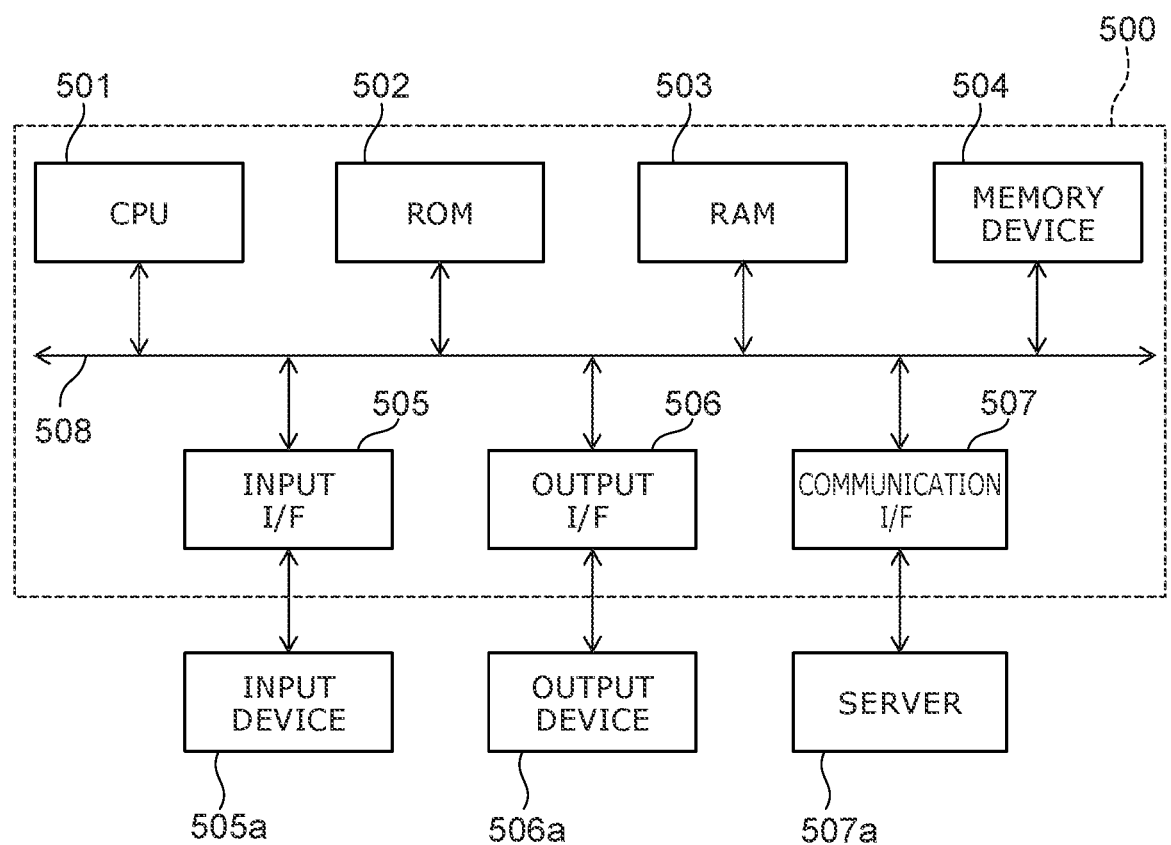
FIG. 37 is a schematic view illustrating a hardware configuration.

FIG. 37 is a schematic view illustrating a hardware configuration.

For example, the instruction device 90 has the hardware configuration illustrated in FIG. 37. A computer 500 illustrated in FIG. 37 includes a CPU 501, ROM 502, RAM 503, a memory device 504, an input interface 505, an output interface 506, and a communication interface 507.

The ROM 502 stores programs controlling the operation of the computer 500. The ROM 502 stores programs necessary for causing the computer 500 to realize the processing described above. The RAM 503 functions as a memory region where the programs stored in the ROM 502 are loaded.

The CPU 501 includes a processing circuit. The CPU 501 uses the RAM 503 as work memory and executes programs stored in at least one of the ROM 502 or the memory device 504. When executing the programs, the CPU 501 controls configurations via a system bus 508 and executes various processing.

The memory device 504 stores data necessary for executing the programs and/or data obtained by executing the programs.

The input interface (I/F) 505 connects the computer 500 and an input device 505a. The input I/F 505 is, for example, a serial bus interface such as USB, etc. The CPU 501 can read various data from the input device 505a via the input I/F 505.

The output interface (I/F) 506 connects the computer 500 and an output device 506a. The output I/F 506 is, for example, an image output interface such as Digital Visual Interface (DVI), High-Definition Multimedia Interface (HDMI (registered trademark)), etc. The CPU 501 can transmit data to the output device 506a via the output I/F 506 and cause the output device 506a to output the data.

The communication interface (I/F) 507 connects the computer 500 and a server 507a outside the computer 500. The communication I/F 507 is, for example, a network card such as a LAN card, etc. The CPU 501 can read various data from the server 507a via the communication I/F 507.

The memory device 504 includes at least one selected from a hard disk drive (HDD) and a solid state drive (SSD). The input device 505a includes at least one selected from a mouse, a keyboard, a microphone (audio input), and a touchpad. The output device 506a includes at least one selected from a monitor, a projector, and a printer. A device such as a touch panel that functions as both the input device 505a and the output device 506a may be used.

According to the handling system, the instruction device, or the handling method described above, the processing necessary for the handling of articles can be automated, and human work can be reduced. Similar effects also can be obtained by using a program for causing the computer to operate as the instruction device.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A handling system, comprising:
    a first mobile robot transporting a first container out of a loading location of the first container, an article being stored in the first container;
    a first transfer robot transferring the first container from one of the first mobile robot or a first loading platform to the other of the first mobile robot or the first loading platform; and
    a picking robot moving the article from the first container placed on the first loading platform to a second container placed on a second loading platform.

2. The handling system according to claim 1, further comprising:
    a second mobile robot transporting the second container; and
    a second transfer robot transferring the second container from one of the second mobile robot or the second loading platform to the other of the second mobile robot or the second loading platform.

3. The handling system according to claim 1, wherein
    the first mobile robot transports a plurality of the first containers, and
    a plurality of articles of mutually-different types is stored in the plurality of first containers.

4. The handling system according to claim 1, further comprising:
    an instruction device transmitting an instruction to the first mobile robot, the first transfer robot, and the picking robot, wherein
    the instruction device transmits the instruction to the first mobile robot and the first transfer robot to transport, from the loading location to the first loading platform, the first container storing the article to be moved to the second container, and
    the instruction device transmits the instruction to the picking robot to move the article from the first container to the second container.

5. The handling system according to claim 4, wherein
    a plurality of the first containers can be loaded on the first loading platform, and
    a plurality of the second containers can be loaded on the second loading platform.

6. The handling system according to claim 5, wherein
    the instruction device transmits the instruction to move a plurality of the articles from not less than two of the first containers to one of the second containers.

7. The handling system according to claim 5, wherein
    the instruction device transmits the instruction to move a plurality of the articles from one of the first containers to not less than one of the second containers.

8. The handling system according to claim 5, wherein
    a first number of the articles is to be moved from one of the plurality of first containers loaded on the first loading platform to one of the plurality of second containers, and
    when the first number is less than an average same-article quantity, the instruction device transmits the instruction to cause a number of the articles to be moved from an other one of the plurality of first containers to an other one of the plurality of second containers to be greater than the first number.

9. The handling system according to claim 5, wherein
    a second number of the articles is to be moved to one of the plurality of second containers, and
    when the second number is less than an average same-article quantity, the instruction device transmits the instruction to load an other one of the plurality of second containers on the second loading platform, so that a number of the articles to be moved to the other one of the plurality of second containers is greater than the second number.

10. The handling system according to claim 5, wherein
not less than two of the first containers are associated with
an order capable of being consecutively processed, and
the instruction device transmits the instruction to cause
the first mobile robot to simultaneously transport the
not less than two first containers.

11. The handling system according to claim 5 to, further
comprising:
an exchange mechanism, the second container loaded on
the second loading platform being interchanged to and
from a storage part by the exchange mechanism,
wherein
an other one of the plurality of second containers is to be
transported out after receiving the article, and
when an interchange interval of the exchange mechanism
for one of the plurality of second containers is less than
an average interchange interval, the instruction device
transmits the instruction to load the other one of the
plurality of second containers on the second loading
platform.

12. An instruction device transmitting an instruction to a
handling system,
the handling system including a first mobile robot, a first
transfer robot, and a picking robot,
the instruction device causing the first mobile robot to
transport a first container out of a loading location of
the first container, an article being stored in the first
container,
the instruction device causing the first transfer robot to
transfer the first container from one of the first mobile
robot or a first loading platform to the other of the first
mobile robot or the first loading platform, and
the instruction device causing the picking robot to move
the article from the first container placed on the first
loading platform to a second container placed on a
second loading platform.

13. The instruction device according to claim 12, wherein
the handling system further includes a second mobile
robot and a second transfer robot,
the instruction device causes the second mobile robot to
transport the second container, and
the instruction device causes the second transfer robot to
transfer the second container from one of the second
mobile robot or the second loading platform to the
other of the second mobile robot or the second loading
platform.

14. A handling method causing a handling system to
handle an article,
the handling system including a first mobile robot, a first
transfer robot, and a picking robot,
the method comprising:
causing the first mobile robot to transport a first container out of a loading location of the first container,
the article being stored in the first container;
causing the first transfer robot to transfer the first
container from one of the first mobile robot or a first
loading platform to the other of the first mobile robot
or the first loading platform; and
causing the picking robot to move the article from the
first container placed on the first loading platform to
a second container placed on a second loading platform.

15. The handling method according to claim 14, wherein
the handling system further includes a second mobile
robot and a second transfer robot,
the second mobile robot is caused to transport the second
container, and
the second transfer robot is caused to transfer the second
container from one of the second mobile robot or the
second loading platform to the other of the second
mobile robot or the second loading platform.

16. A non-transitory computer-readable storage medium
storing a program that, when executed by a computer, causes
the computer to execute a handling method for a handling
system, the handling system including a first mobile robot,
a first transfer robot, and a picking robot, the method
comprising:
causing the first mobile robot to transport a first container
out of a loading location of the first container, an article
being stored in the first container;
causing the first transfer robot to transfer the first container from one of the first mobile robot or a first
loading platform to the other of the first mobile robot or
the first loading platform; and
causing the picking robot to move the article from the first
container placed on the first loading platform to a
second container placed on a second loading platform.

\* \* \* \* \*